(12) United States Patent  (10) Patent No.: US 7,663,975 B2
Dubuis et al.  (45) Date of Patent: Feb. 16, 2010

(54) UNDERWATER DETECTION APPARATUS

(75) Inventors: Jerome Dubuis, Nishinomiya (JP); Hitoshi Maeno, Nishinomiya (JP); Florian Girault, Nishinomiya (JP)

(73) Assignee: Furuno Electric Company Limited, Kishinomiya-shi (JP)

( * ) Notice: Subject to any disclaimer, the term of this patent is extended or adjusted under 35 U.S.C. 154(b) by 0 days.

(21) Appl. No.: 12/079,393

(22) Filed: Mar. 26, 2008

(65) Prior Publication Data

US 2008/0247275 A1  Oct. 9, 2008

Related U.S. Application Data

(60) Provisional application No. 60/920,040, filed on Mar. 26, 2007, provisional application No. 60/920,089, filed on Mar. 26, 2007.

(51) Int. Cl.
 *G01S 15/08* (2006.01)
(52) U.S. Cl. .................................................... 367/100
(58) Field of Classification Search ................ 367/100, 367/131, 11, 88
See application file for complete search history.

(56) References Cited

U.S. PATENT DOCUMENTS 4,207,620 A * 6/1980 Morgera ...................... 367/88
2008/0247275 A1 * 10/2008 Dubuis et al. .............. 367/131

FOREIGN PATENT DOCUMENTS

JP  2006-52987  2/2006

* cited by examiner

*Primary Examiner*—Dan Pihulic
(74) *Attorney, Agent, or Firm*—Nutter McClennen & Fish LLP; John J. Penny, Jr.

(57) ABSTRACT

An underwater detection apparatus for detecting a target by transmitting and receiving an ultrasound signal is provided. The apparatus includes a replica memory module for storing the typical amplitude evolution of a seawall echo during a predetermined time period as a template-replica beforehand, a correlator module for determining a correlation between the amplitude evolution of an echo signal reflected from the target and the template-replica, a seawall detector module for detecting a seawall position based on the correlation, and a seawall display processor module for displaying the seawall on its position in an indicator.

7 Claims, 41 Drawing Sheets

Fig.9
Related Art
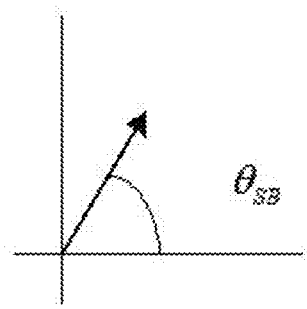
Seabed
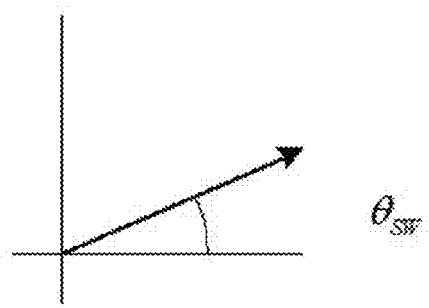
Seawall

Step1: Input echo data from beams0

Step2: Measure cross-correlation $r()$

Step3: Measure attenuation $Att()$

Step4: Store samples

Step5: Classify the stored samples into seawall samples or air bubble samples

Step6: Detect the seawall position based on the samples classified as seawall

Step7: Display the seawall at the detected seawall position

Attenuation vs. Cross-correlation for seawall echoes

Attenuation vs. Cross-correlation for air bubble echoes

UNDERWATER DETECTION APPARATUS The present application claims priority under 35 USC §119 (e) to U.S. Provisional Applications No. 60/920,040 filed Mar. 26, 2007 and No. 60/920,089 filed Mar. 26, 2007, which are hereby incorporated by reference herein in its entirety.

FIELD OF THE INVENTION

The present invention relates to underwater or radar equipments used for obstacle detection.

BACKGROUND OF THE INVENTION

Underwater Detection Apparatus 100 (see FIG. 1) such as Forward Looking Sonar (FLS) systems are designed to build a two dimensional image along a vertical slice in front of the vessel as shown in FIG. 1. Underwater Detection Apparatus 100 is comprised of a plurality of Transducer Elements 1, Transmitting Beam Former 2, Receiving Beam Former 3a and 3b, Echo Display Processor 4, and Indicator 5, as shown in FIG. 2.

With such FLS systems, the depth of the seabed can be detected a distance ahead of the vessel. The FLS is mainly used as an underwater collision avoidance system to detect shallows, seawalls or possibly driftwoods well ahead of the vessel, by displaying such echoes on Indicator 5 as shown in FIG. 3.

However, the FLS systems using the split beam technique are weak at displaying echoes from multiple targets coming from different directions at the same time. This is particularly the case with the presence of a seawall ahead of the vessel.

Transducer Elements 1 of a split beam system are made of several transducer elements: 8 elements in the case of the present system.

When transmitting, the elements of Transducer Elements 1 are used as a single array. Controlling the transmitting time on each element (i.e. the relative transmitting phase on each element) controls the transmitting beam pattern of the transmitted acoustic wave in the vertical plane. The transmitting beam pattern is made so that the transmitted acoustic wave propagates ahead of the vessel from below the water surface until below the vessel, in one single ping, as shown in FIG. 4.

When receiving, the elements of Transducer Elements 1 are split into two sub arrays of elements: two sub-arrays of 4 elements in the case of the present system. A receiving beam former creates a receiving beam with each sub-array, thereby creating a pair of receiving beams, as shown in FIG. 5. This technique is called the "split beam" technique. Such echoes created by this split beam technique are displayed in Indicator 5 via Echo Display Processor 4 for processing for the display of echoes.

The split beam technique is described hereinafter.

As the width of the pair of receiving beams is thin (28.5°) compared to the transmitted beam (90°), the FLS steers the pair of receiving beams from the horizontal direction (beams steered directly ahead of the vessel) to the vertical direction (beams steered directly below the vessel). There are a total of 90 steering beams. Beams0 indicates the horizontal pair of beams, whereas beams89 indicates the pair of beams 1-degree off the vertical direction. Each pair of beams is separated by 1°. FIG. 6 shows three pairs of receiving beams, beams0, beams$\phi$ and beams89, $\phi$ being any value between 0° and 89°, with 1° increment.

The aim of the split beam technique is to be able to determine the direction of the incoming echo. FIG. 7, shows an echo coming from a direction $\alpha$ relative to the acoustic axis of the pair of receiving beams$\phi$. In such a situation, the acoustic wave of the echo reaches sub array1 before reaching sub array2. Reference letter d the distance between centers of each sub array. The extra traveling distance of the echo to reach sub array2 is therefore d·sin $\alpha$. As the arrival time of the echo on sub array1 and sub array2 is different, the phase information on sub array1 and sub array2 is different. Let's call $\theta$ the difference of phase information between sub array1 and sub array2. $\alpha$ and $\theta$ are linked with the following eq. 1.

$$\alpha = \sin^{-1}\left(\frac{\lambda \cdot \theta}{2\pi \cdot d}\right) \quad \text{(eq. 1)}$$

Where $\lambda$ represents the wavelength.

Therefore, the incoming direction $\alpha$ can be determined knowing the phase difference $\theta$ of the incoming echo using eq. 1.

Once the 90 pairs of receiving beams are created, the following set of information is retrieved from each pair of beams:

The amplitude information of echoes.

The phase difference information between sub array1 and sub array2.

The time of arrival of echoes relative to the transmitting time.

Knowing the 3 sets of information above, echoes of targets are plotted on the display unit of the FLS as shown in FIG. 3.

Eq. 1 shows a unique relation between $\alpha$ and $\theta$. However, since the transmission beam is very broad, there are situations where several echoes from different directions are coming back at the same time. This is particularly the case with underwater structures such as seawalls, as the echoes from the seabed and the seawall are coming back at the same time, as shown in FIG. 8. A dotted line in FIG. 8 shows the equidistant positions from Transducer Elements 1.

In this situation too, as the relation between $\alpha$ and $\theta$ is unique, the resulting incoming direction $\alpha$ of these multiple echoes has to be unique.

When considered separately, these two echoes would be received for example with a phase difference and amplitude information represented by the two vectors in FIG. 9, where the size of the vector is representative of the amplitude information and the angle of the vector is representative of the phase difference information.

As both echoes are coming back at the same time, information vectors are combined and the combined vector ends up in an intermediate position, in between the two original vectors, as shown in FIG. 10.

Basically, the combined vector is pulled towards the vector with the strongest amplitude.

Therefore, when two echoes from two different directions reach the FLS at the same time, the FLS displays the resulting echo in an intermediate position between the two real target positions, as shown in FIG. 11.

As a result, seawall tends to not be displayed as extending to the water surface. FIG. 12 shows a typical FLS view taken in front of a seawall. There is a gap of several meters between the water surface and the displayed seawall.

Therefore, depending on the user and the type of vessel used, some users may wrongly think that they can proceed ahead without danger, which could lead to very dangerous situations.

As such views could lead to very dangerous situations, there is a need to be able to detect seawalls reliably and inform the user if such danger is detected. This is the purpose of this invention.

In order to do that, this invention performs a seawall detection using the fact that the amplitude information of echoes received on a receiving beam directed towards the seawall decreases with time as no echoes are coming back from behind the seawall. However, echoes of air bubbles close to the sea surface can have a similar characteristic. Air bubble echoes are mainly created by propellers of motorboats and can therefore be found a lot in places such as along the coastline and near harbors. Air bubble echoes are a very good ultrasound reflector. Therefore ultrasound waves hardly go through thick mass of air bubbles and therefore there are very few or no echoes coming back from behind such mass of air bubbles. As a result, an attenuation of the amplitude of echoes after the mass of air bubbles can happen in a similar way as after a seawall.

As characteristics of seawalls and air bubbles can be very similar, there is a need to classify echoes received with an attenuation of amplitude into either seawall echoes or air bubble echoes in order to avoid alarming the user because of a misdetection of air bubble echoes: this is the aim of this invention.

SUMMARY OF THE INVENTION

At least one embodiment of the invention performs a seawall detection using the fact that the amplitude information of echoes suddenly decreases with time behind the seawall itself. Received echoes are cross-correlated with the typical attenuation curve that occurs behind a seawall in order to measure the degree of similarity between the received echo and the typical attenuation curve. An attenuation filter is applied on the received echoes in order to measure the variation of amplitude on the received echo signal.

However, air bubbles left by the wake of motorboats near the sea surface can produce similar characteristics on the received amplitude information. In order to avoid false alarm detection on air bubble echoes, the cross-correlation and attenuation information is passed through a classifier module that checks if the input value is within the pre-defined seawall "zone" and classifies the input as either a seawall or not.

Echoes classified as seawall are stretched up to the water surface so that there is no ambiguity for the user when looking at the display unit whether there is a seawall or not.

According to one aspect of at least one embodiment of the invention, an underwater detection apparatus for detecting a target by transmitting and receiving an ultrasound signal is provided. The apparatus includes a replica memory module for storing the typical amplitude evolution of a seawall echo during a predetermined time period as a template-replica beforehand, a correlator module for determining a correlation between the amplitude evolution of an echo signal reflected from the target and the template-replica, a seawall detector module for detecting a seawall position based on the correlation, and a seawall display processor module for displaying the seawall on its position in an indicator.

The underwater detection apparatus may further include an attenuator module for determining the echo signal attenuation reflected from the target during a predetermined time period. The seawall detector module may detect the seawall position based on the correlation and the attenuation.

The underwater detection apparatus may further include a classifier module for classifying the echo signal into a seawall echo or a non-seawall echo, based on the comparison of the correlation and the attenuation using a stochastic method. The seawall detector module may detect the seawall position based on at least one of the correlation and the attenuation if the classifier module classifies the echo signal into the seawall echo. The stochastic method may be based on Bayesian theory.

The underwater detection apparatus may further include an echo display processor module for displaying echoes reflected from multiple targets in a split beam system. The seawall display processor module may display the seawall from the upper portion of the displayed echo to a water surface on its position.

According to another aspect of at least one embodiment of the invention, an underwater detection apparatus for detecting a target by transmitting and receiving an ultrasound signal is provided. The apparatus includes an attenuator module for determining the echo signal attenuation reflected from the target during a predetermined time period, a seawall detector for detecting a seawall position based on the attenuation, and a seawall display processor module for displaying the seawall on its position in an indicator.

The underwater detection apparatus may further include an echo display processor module for displaying echoes reflected from multiple targets in a split beam system. The seawall display processor module may display the seawall from the upper portion of the displayed echo to a water surface on its position.

BRIEF DESCRIPTION OF THE DRAWINGS

FIG. 9 shows a schematic view of phase and amplitude information of two echoes coming back at the same time but considered separately.

DETAILED DESCRIPTION

Preferred embodiments of the present invention are demonstrated hereinafter with reference to the accompanying drawings.

Figure 1:
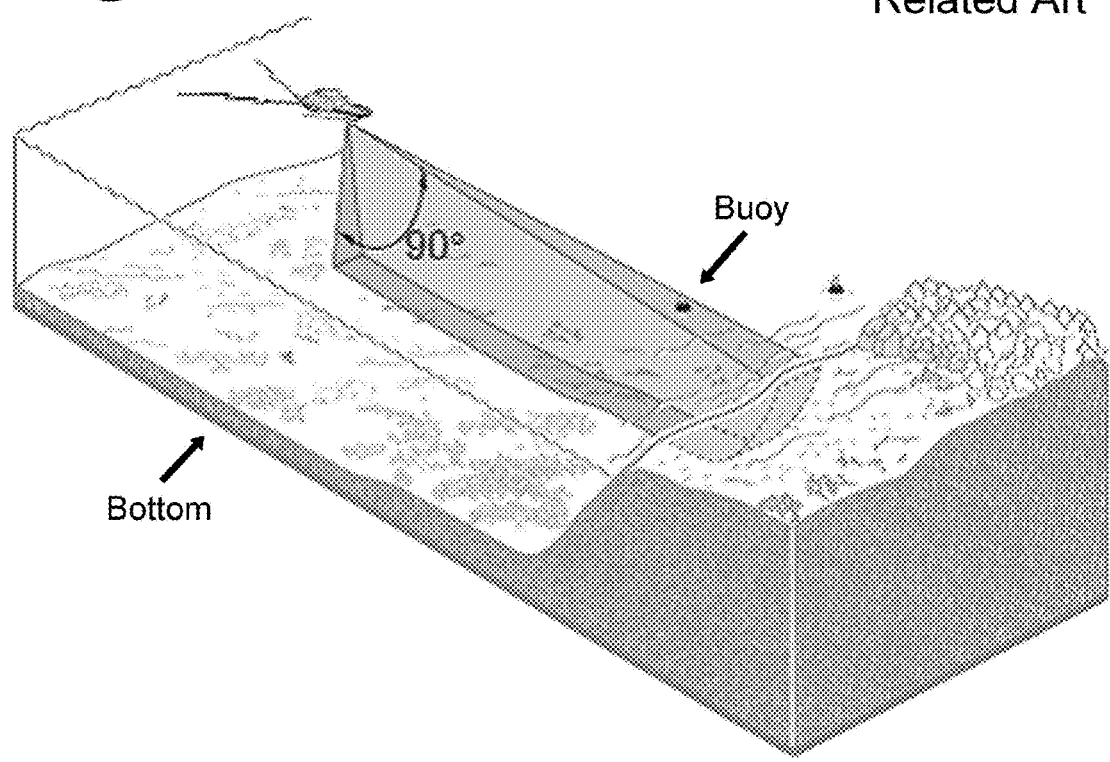
FIG. 1 shows the acoustically visible range of Forward Looking Sonar of the related art.
Figure 2:
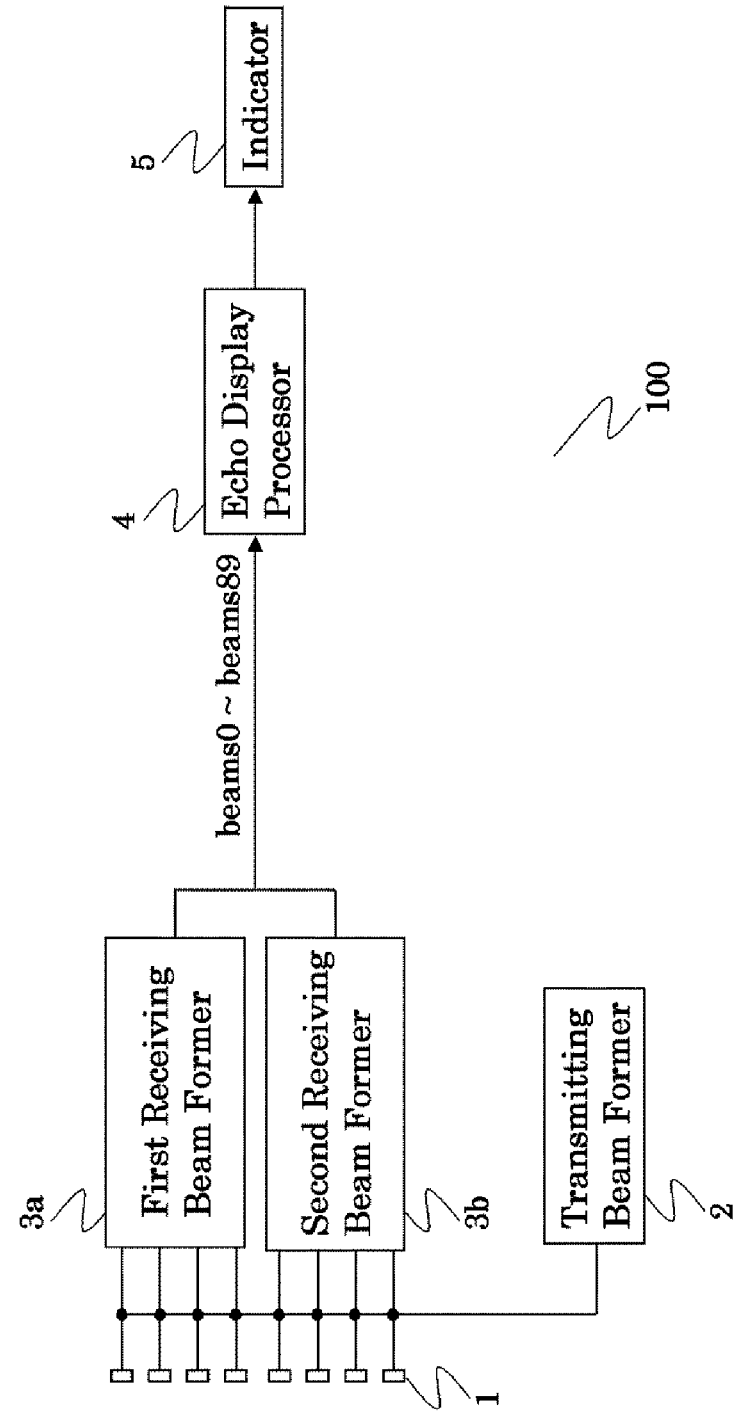
FIG. 2 shows a block diagram of an Underwater Detection Apparatus 100 of the related art.
Figure 3:
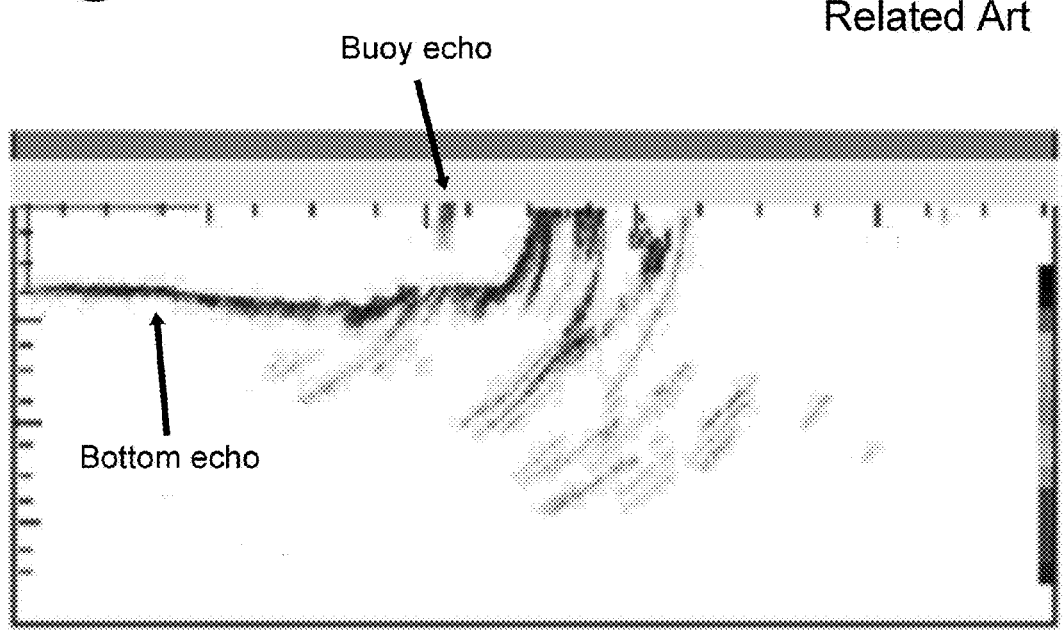
FIG. 3 shows a display example of detected echoes by Forward Looking Sonar system of the related art.
Figure 4:
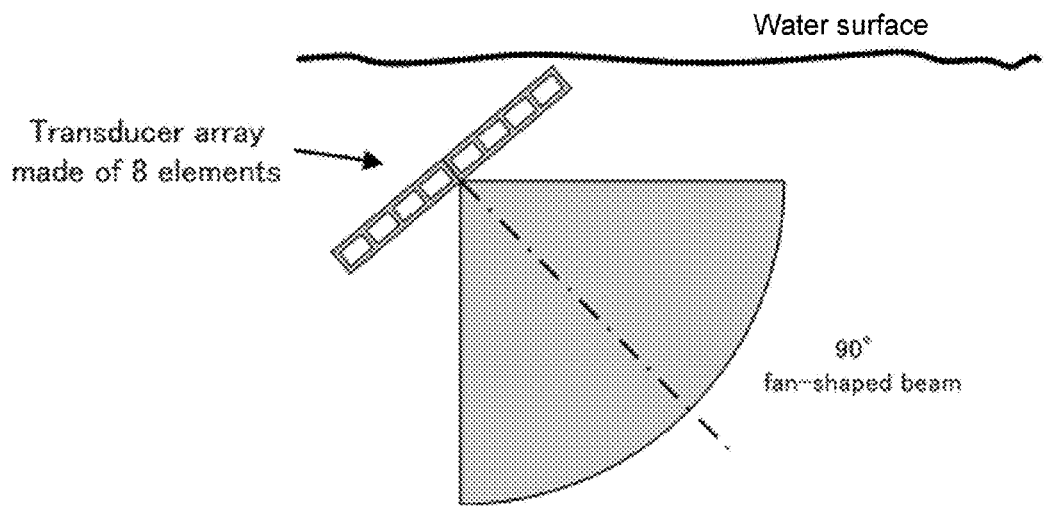
FIG. 4 shows a schematic view of the transmitting beam of the FLS.
Figure 5:
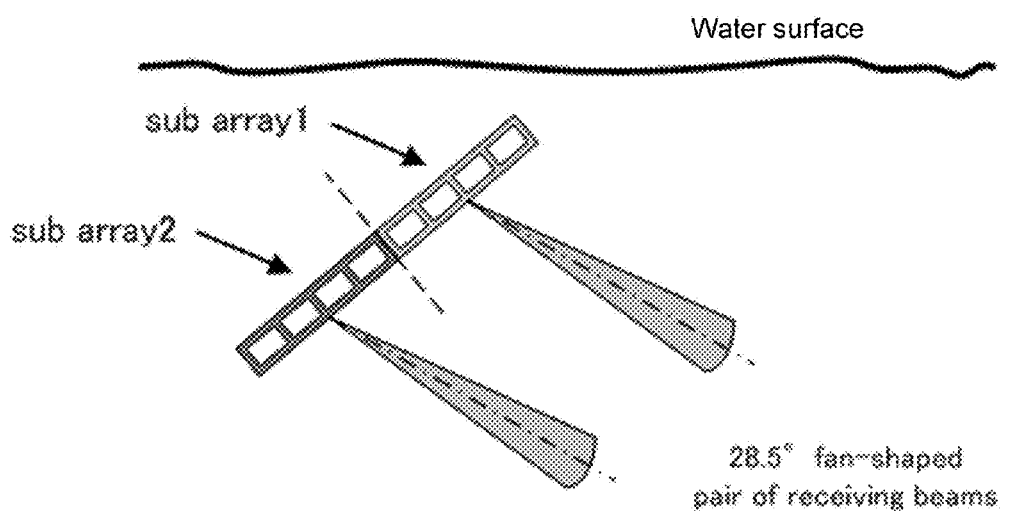
FIG. 5 shows a schematic view of a pair of receiving beams in a split beam system.
Figure 6:
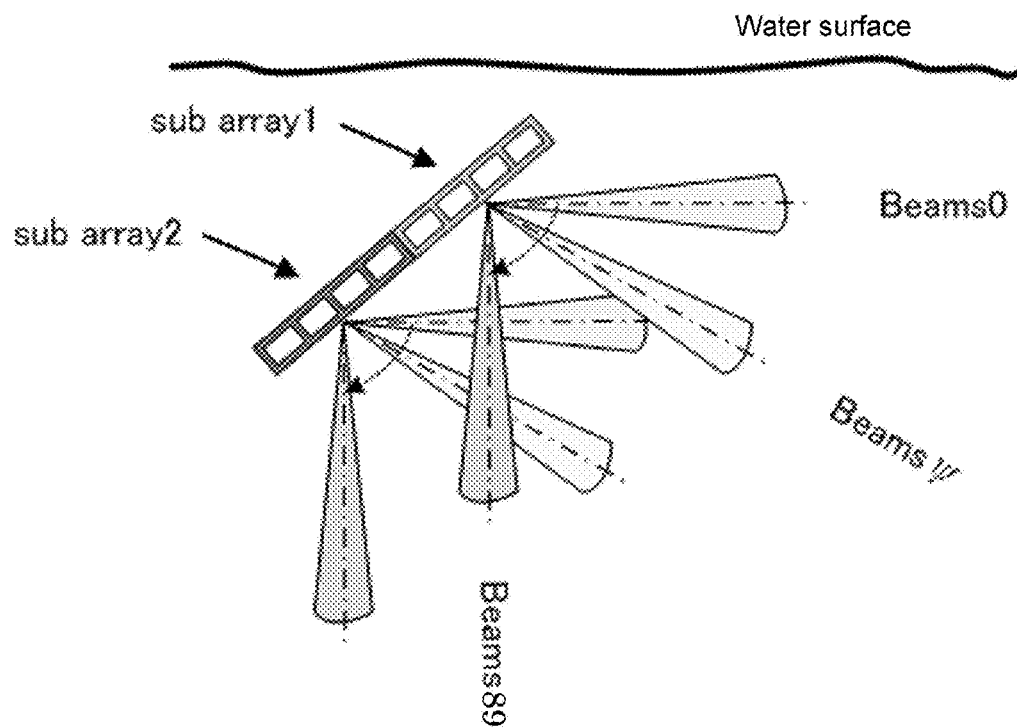
FIG. 6 shows a schematic view of 3 steering pairs of receiving beams in a split beam system.
Figure 7:
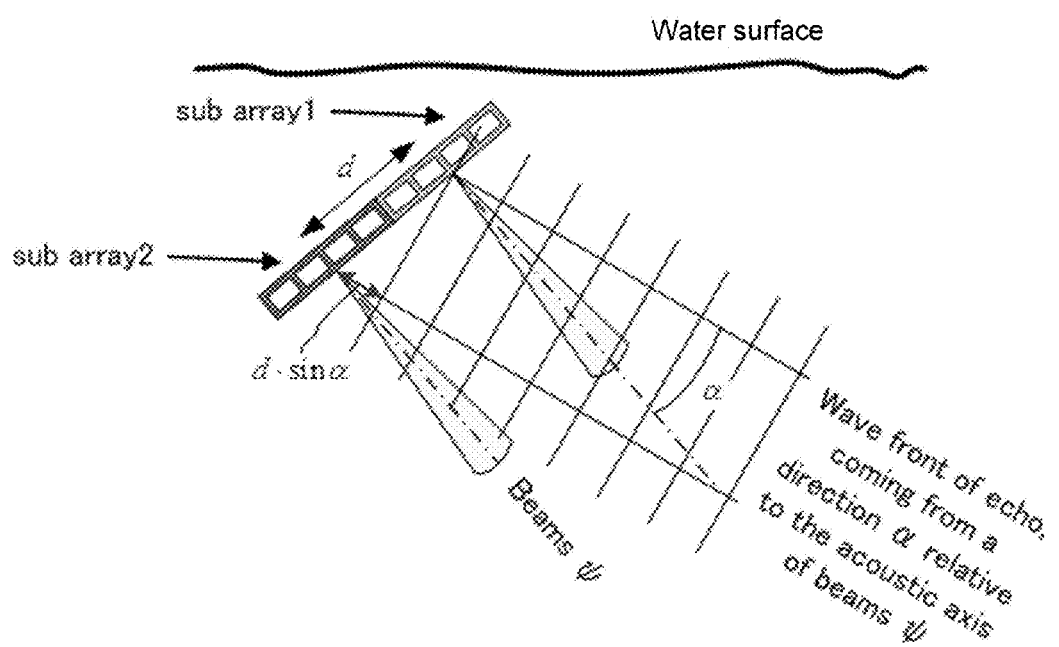
FIG. 7 shows an explanation view to determine the direction of the incoming echo in a split beam system.
Figure 8:
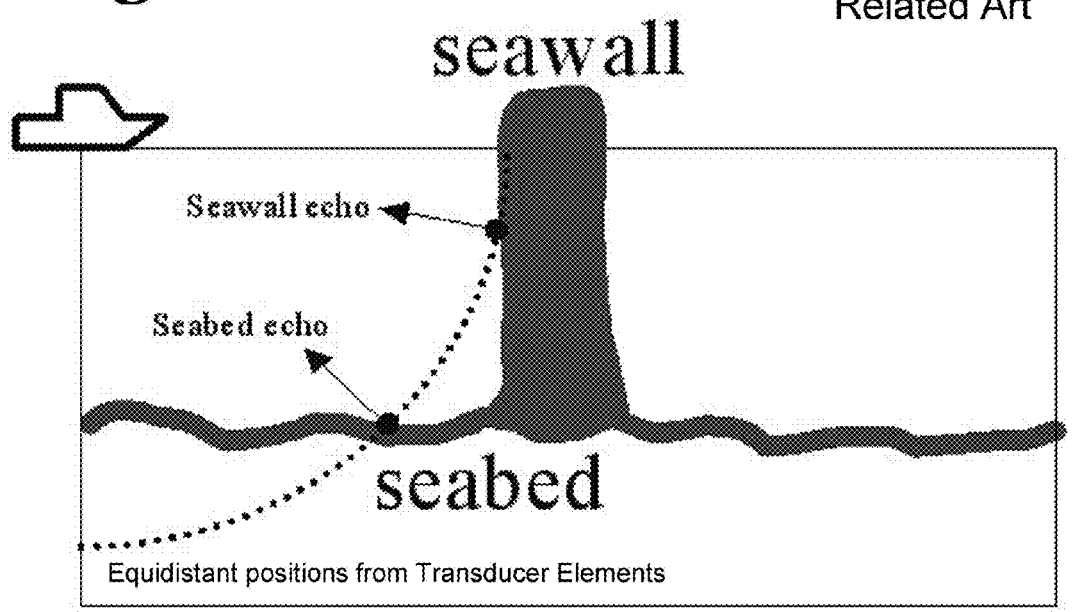
FIG. 8 shows a schematic view of echoes coming back at the same time in case of a seawall structure.
Figure 10:
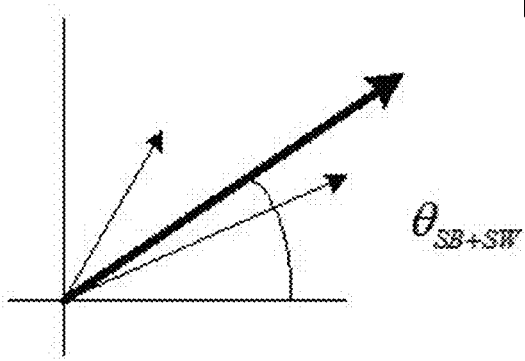
FIG. 10 shows a schematic view of phase and amplitude information of 2 combined echoes.
Figure 11:
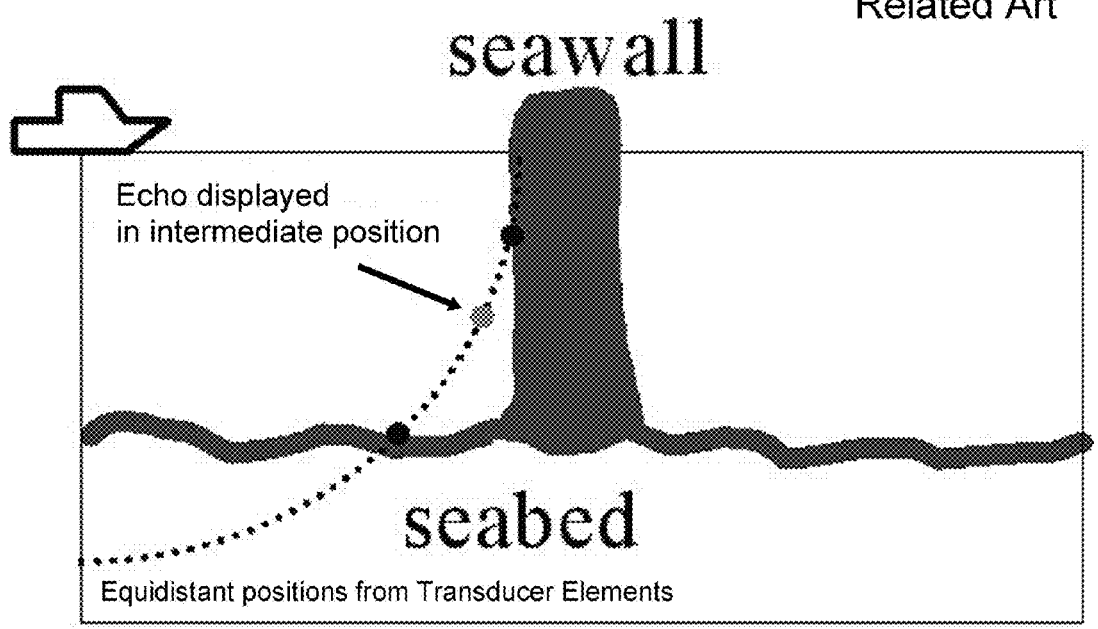
FIG. 11 shows a schematic view of how combined echoes are displayed.
Figure 12:
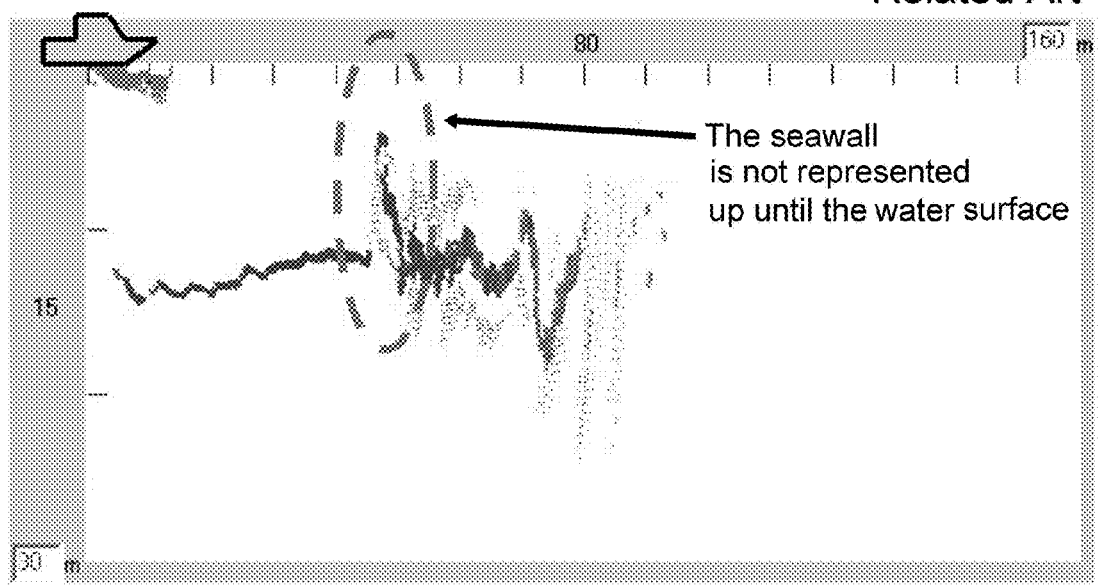
FIG. 12 shows how seawall echoes are displayed by a split beam FLS of the related art.

The embodiment is described hereinafter with reference to FIG. 6 and figures FIG. 13 to FIG. 41.

Figure 13:
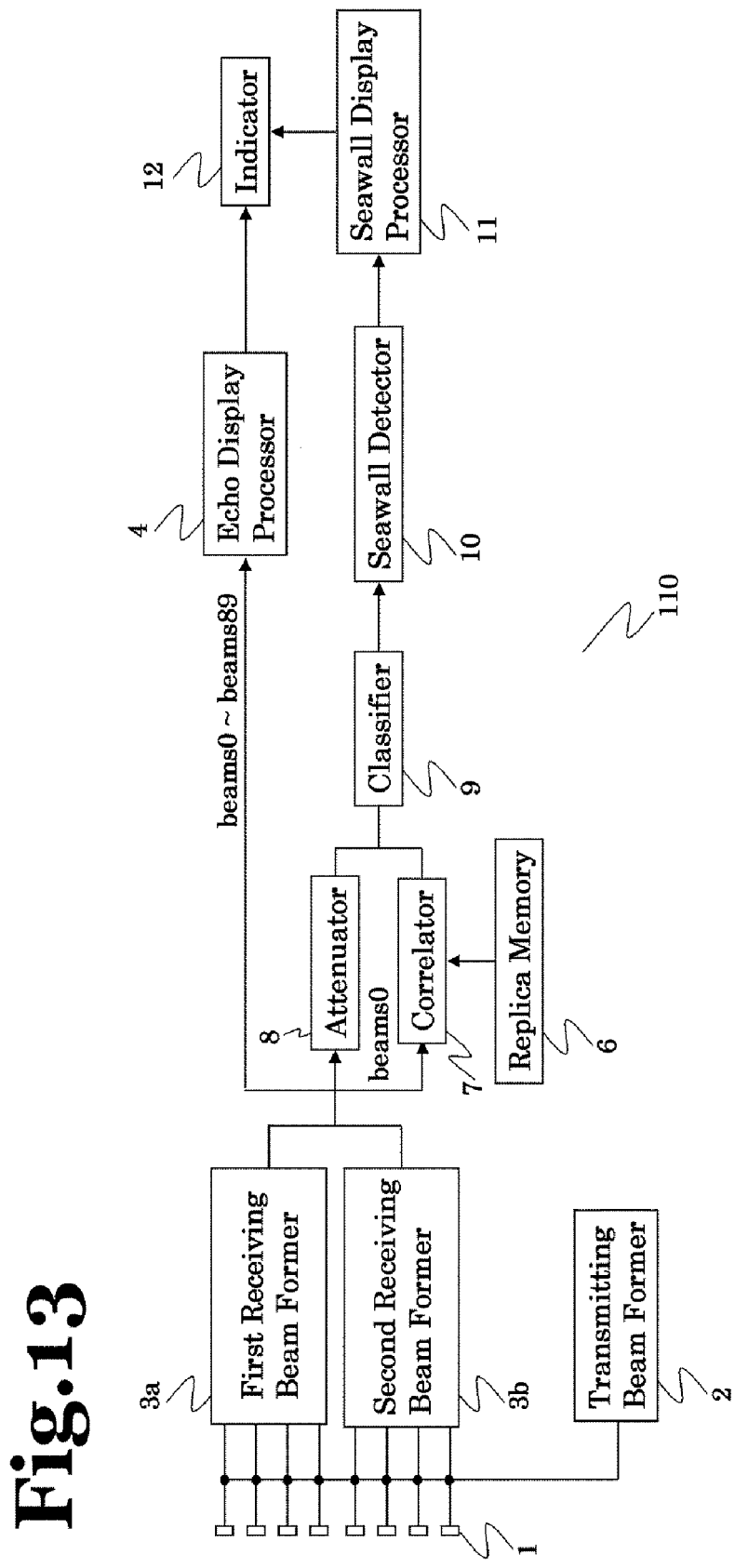
FIG. 13 shows a block diagram of Underwater Detection Apparatus 110.

Underwater Detection Apparatus 110 is comprised of a plurality of Transducer Elements 1, Transmitting Beam Former 2, Receiving Beam Former 3a and 3b, Echo Display Processor 4, Replica Memory 6, Correlator 7, Attenuator 8, Classifier 9, Seawall Detector 10, Seawall Display Processor 11, and Indicator 12 as shown in FIG. 13. Explanation of Transducer Elements 1, Transmitting Beam Former 2, Receiving Beam Former 3, and Echo Display Processor 4 are omitted, because they are similar to the background of the invention.

Replica Memory 6 stores the amplitude evolution of an echo signal reflected from a typical seawall during a predetermined time period as a template-replica beforehand. The template-replica has been created by taking hundreds of echo data from a specific seawall and by taking the average of amplitude from the position of the seawall. The template-replica is characterized by being an attenuated amplitude evolution. Further, the replica curve has been created from experimental data; it could however have been created theoretically with a simulation program for example.

Correlator 7 measures the cross-correlation between the amplitude evolution of an echo signal reflected from a target and the template-replica during the predetermined time period. The amplitude evolution information received on the horizontal pair of receiving beams$\phi$, directed directly towards the seawall in FIG. 6 is used. Note that the choice of the pair of receiving beams is however not limited to the horizontal pair of beams$\phi$; the seawall detection could be adjusted to work with other pairs of beams. As no echoes are coming back from behind the seawall itself, the amplitude behind the seawall decreases with time, just as the template-replica does. The positions where the cross-correlation is higher than a predetermined value can be considered as possible seawall positions. This is one characteristic used to perform seawall detection. Further, a concrete equation of cross-correlation is described below.

Attenuator 8 measures the attenuation of the echo signal reflected from a target along the predetermined time period. As in Correlator 7, the echo signal information received on the horizontal pair of receiving beams$\phi$, directed directly towards the seawall in FIG. 6 is used. Note that the choice of the pair of receiving beams is however not limited to the horizontal pair of beams$\phi$; the seawall detection could be adjusted to work with other pairs of beams. The cross-correlation measured by Correlator 7 tells the degree of correlation of the received amplitude evolution with the replica but does not give any information about the echo signal attenuation that actually occurs. The aim of the Attenuator 8 is to measure the amount of attenuation that occurs behind the seawall. The positions where the amount of attenuation is larger than a predetermined value can be considered as possible seawall positions. This is another characteristic used to perform seawall detection. Further, a concrete equation of attenuation is described below.

Classifier 9 classifies the echo data from beams$\phi$ into seawall samples or air bubble samples based on r( ) and Att( ) measured by Correlator 7 and Attenuator 8. Classifier 9 compares the r( ) and Att( ) pairs of samples and classifies the samples using a stochastic method based on Bayesian theory.

Seawall Detector 10 detects a seawall position based on the results of Correlator 7 and Attenuator 8, if Classifier 9 classified the echo date into seawall samples. Seawall samples whose attenuation and cross-correlation values are both larger than predetermined values at the same time are considered as samples representative of a seawall. If more than one sample is representative of a seawall, the sample with the maximum amplitude is selected as the sample representative of the seawall and this sample determines the position of the seawall.

Seawall Display Processor 11 displays a seawall at the position detected by Seawall Detector 10 in Indicator 12. For example, Seawall Display Processor 11 displays a vertical seawall at the relevant position in Indicator 12. Further a hue of a displayed seawall may be determined based on the echo level at the position, or an arbitrary hue.

Figure 14:
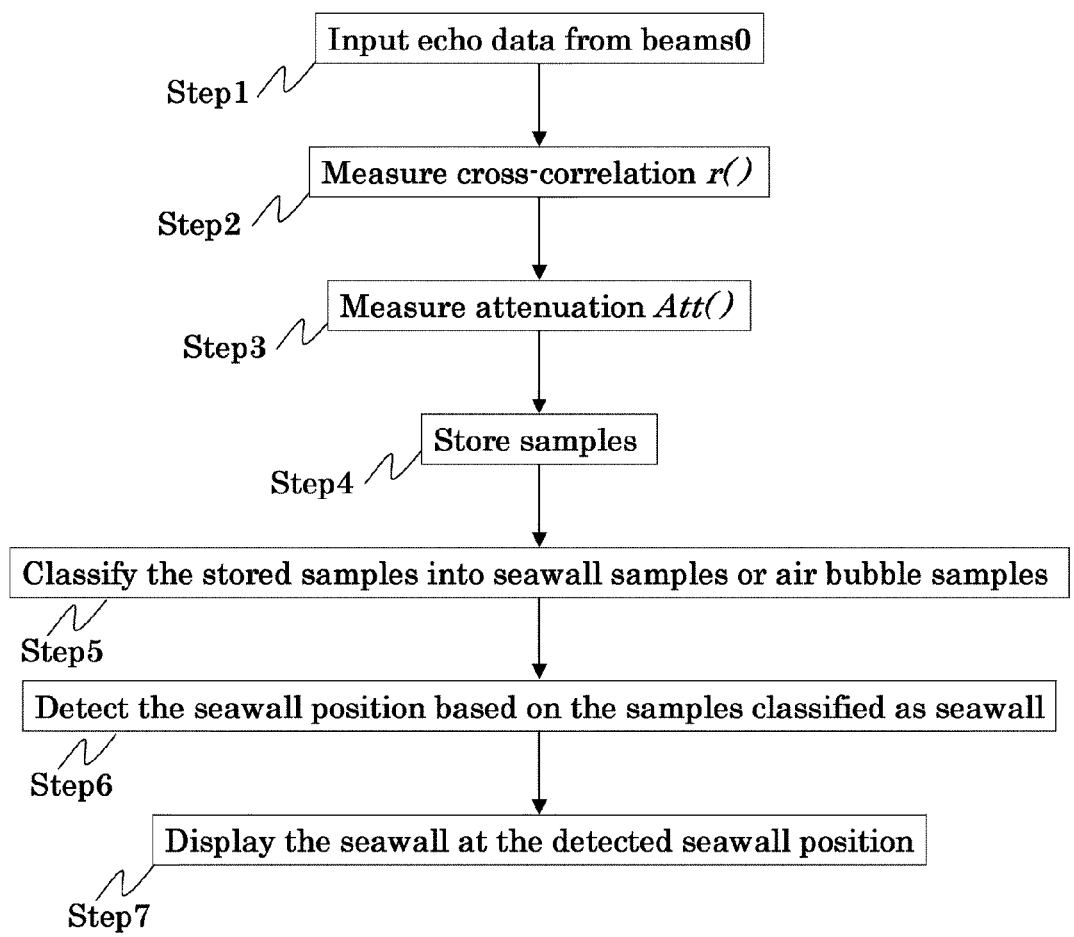
FIG. 14 shows a flowchart of Underwater Detection Apparatus 110.

Next, Correlator 7, Attenuator 8, Classifier 9, and Seawall Detector 10, and Seawall Display Processor 11 are explained using a flow chart shown in FIG. 14.

(Step 1)

Figure 15:
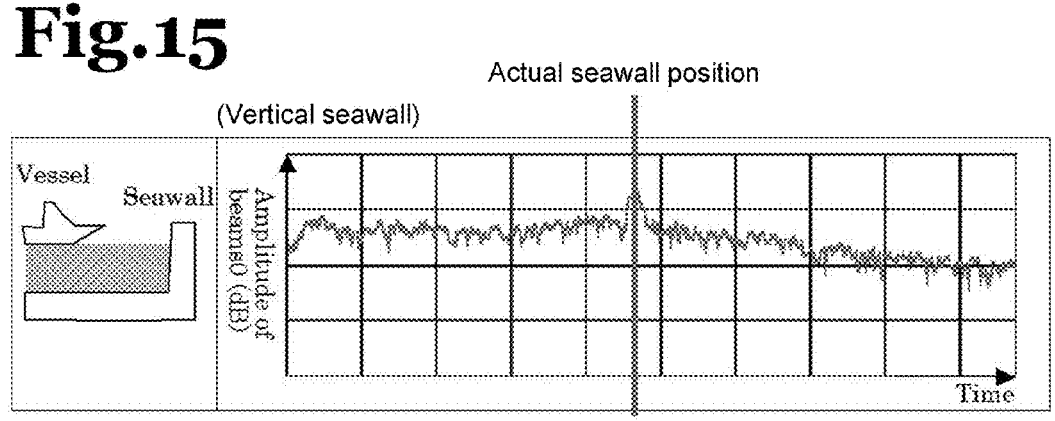
FIG. 15 shows amplitude information of beams0, taken in front of a vertical seawall.
Figure 16:
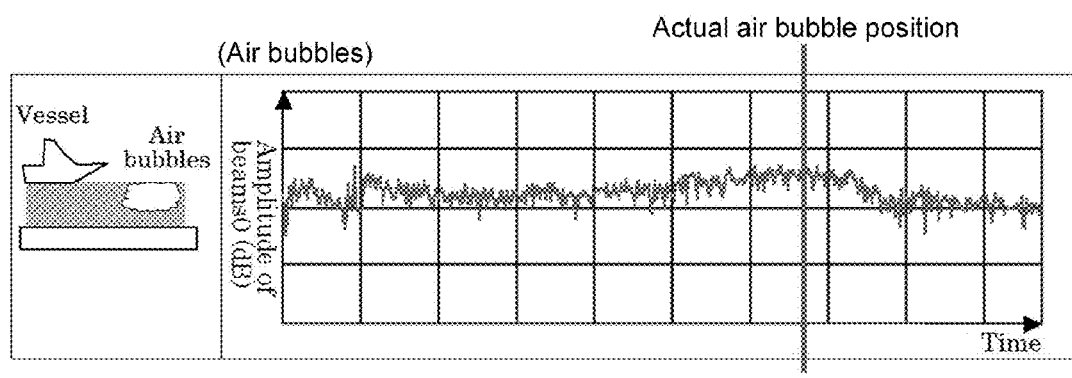
FIG. 16 shows amplitude information of beams0, taken in front of air bubbles.

Correlator 7 and Attenuator 8 input all echo data of beams0 as shown in FIG. 15 and FIG. 16.

FIG. 15 shows the amplitude information of beams0, taken in front of a vertical seawall. The seawall extends straight from the seabed, vertically. The vertical scale shows the amplitude, the horizontal scale shows time (distance), and the vertical line shows the actual position of the seawall in FIG. 15. The two characteristics that stand out of this amplitude curve are:

The peak amplitude that occurs at the position of the seawall.

The attenuation of the amplitude after the position of the seawall.

FIG. 16 shows the amplitude information of beams0, taken in front of a mass of air bubbles left by the wake of another boat. The vertical line indicates the position of the mass of air bubbles. As can be seen, similarly to a seawall echo, there is an attenuation of amplitude after the mass of air bubbles.

(Step 2)

Figure 17:
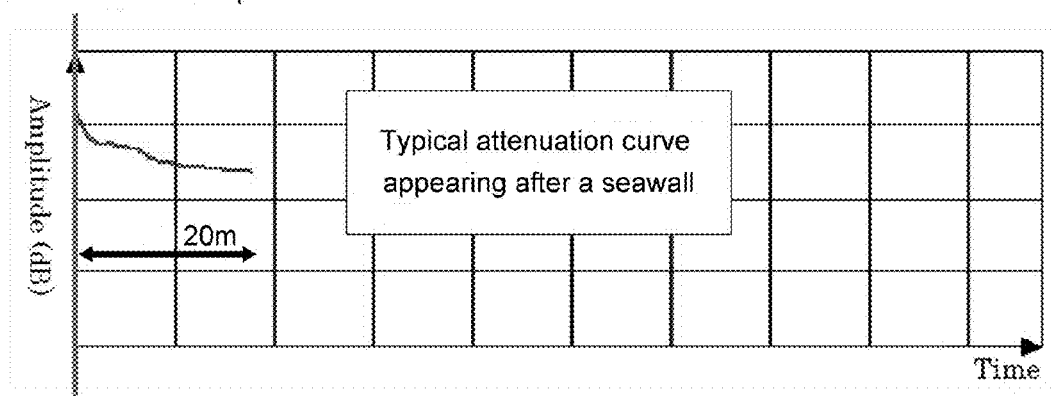
FIG. 17 shows the amplitude evolution of the template-replica.

Correlator 7 measures the cross-correlation between echo data of beams0 and the template-replica during the predetermined time period. This predetermined time period is the same as the length of the template-replica. The template-replica curve starts from the position of the seawall and extends along 20 m after the position of the seawall as shown in FIG. 17. The vertical scale shows the amplitude, and the horizontal scale shows time (distance) in FIG. 17. It is to be noted that the template-replica curve is 20 m long but the length could be adjusted differently.

Further, the cross-correlation r( ) at delay d between the template-replica curve x( ) and beamsφ amplitude curve y( ) is defined in the following eq. 2.

$$r(d) = \frac{\sum_{i=0}^{I_{MAX}-1}[(x(i)-mx)\cdot(y(i+d)-my)]}{\sqrt{\sum_{i=0}^{I_{MAX}-1}(x(i)-mx)^2} \cdot \sqrt{\sum_{i=0}^{I_{MAX}-1}(y(i+d)-my)^2}} \quad \text{(eq. 2)}$$

Where mx and my are respectively the means of x( ) and y( ) along the 20 m:

$$mx = \frac{1}{I_{MAX}} \cdot \sum_{i=0}^{I_{MAX}-1} x(i)$$

$$my = \frac{1}{I_{MAX}} \cdot \sum_{i=0}^{I_{MAX}-1} y(i+d)$$

$I_{MAX}$ represents 20 m worth of samples.

It is to be noted that the denominator and the mx and my values of eq. 2 serve to normalize the result of the cross-correlation such that $-1 \leq r(d) \leq 1$, $-1$ and $1$ indicating high correlation and 0 indicating no correlation. A high negative correlation indicates a high correlation but of the inverse of the replica. The cross-correlation could also be calculated without these normalization factors.

Figure 18:
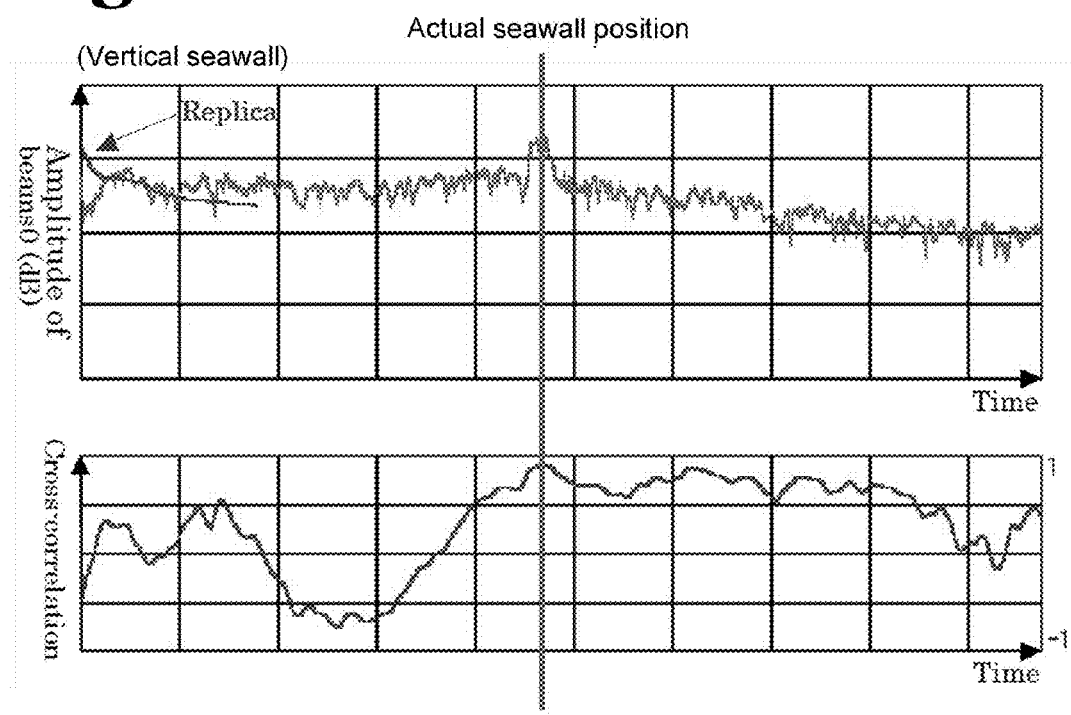
FIG. 18 shows the result of the cross-correlation r( ), performed on the amplitude curve of FIG. 15.
Figure 19:
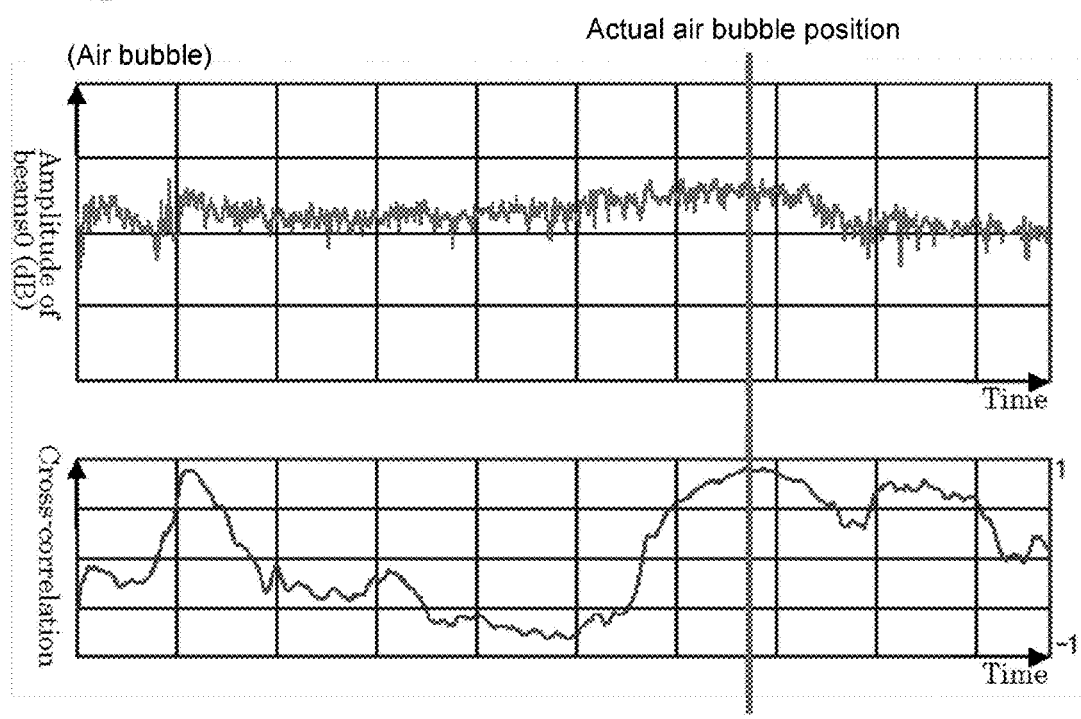
FIG. 19 shows the result of the cross-correlation r( ), performed on the amplitude curve of FIG. 16.

FIG. 18 shows the result of the cross-correlation r( ) performed on the amplitude curve of FIG. 15. The vertical scale shows the cross-correlation r( ), the horizontal scale shows time (distance), and the vertical line shows the actual position of the seawall in FIG. 18. As can be seen in FIG. 18, the cross-correlation level at the seawall position reaches values close to 1. FIG. 19 shows the result of the cross-correlation r( ) performed on the amplitude curve of FIG. 16, in the same way as FIG. 18.

(Step 3)

Attenuator 8 measures the attenuation of the echo signal reflected from the target along the predetermined time period. This predetermined time period is the same as the length of the template-replica. Similar to the cross-correlation process that uses a 20 m-long replica curve, the attenuation filter measures the attenuation that occurs along 20 m. It is to be noted that this length could be adjusted differently and independently from the cross-correlation process.

Further, the amount of attenuation Att( ) at delay d on the amplitude signal y( ) is calculated using the following eq. 3.

$$Att(d) = \frac{\sum_{i=-(n_1-1)/2}^{(n_1-1)/2} y(d+i)}{n_1} - \frac{\sum_{i=-(n_2-1)/2}^{(n_2-1)/2} y(d+\Delta+i)}{n_2} \quad \text{(eq. 3)}$$

Where $n_1$ represents the number of samples used to calculate the average amplitude around sample d: low pass filter function.

$n_2$ represents the number of samples used to calculate the average amplitude around sample d+Δ: low pass filter function.

Δ represents the distance between the two positions considered to calculate the amount of attenuation. Practically, Δ is set so that the distance is equivalent to 20 m.

Figure 20:
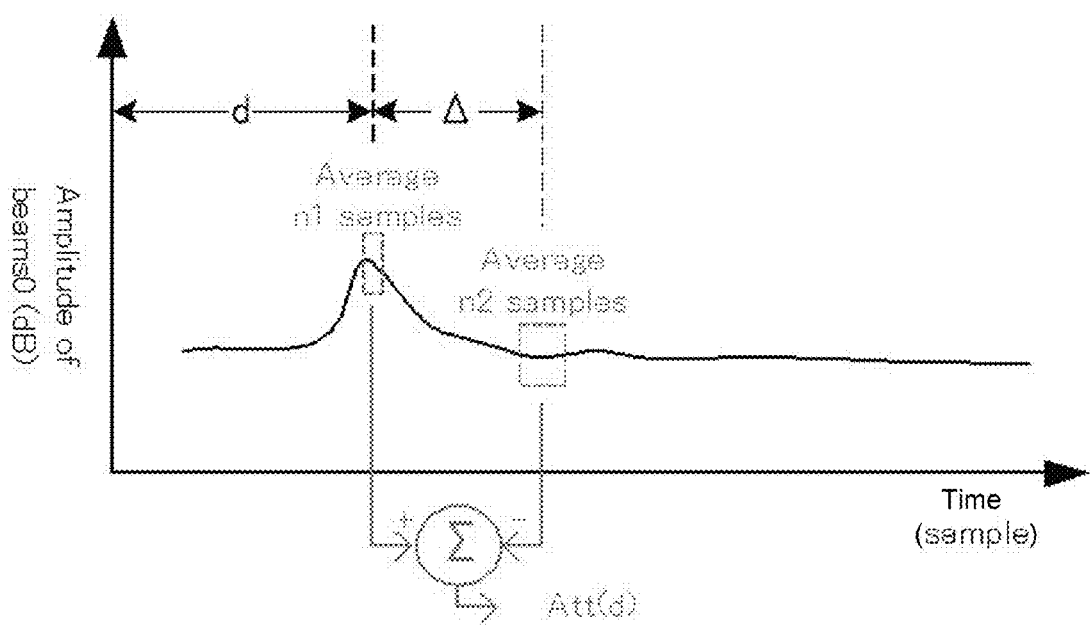
FIG. 20 shows the process of Attenuator 8.

The process of Attenuator 8 is illustrated as shown in FIG. 20. The vertical scale shows the amplitude, and the horizontal scale shows time (distance) in FIG. 20. It is to be noted that Δ can be adjusted differently and that the average functions performed around samples d and d+Δ could also be removed.

Figure 21:
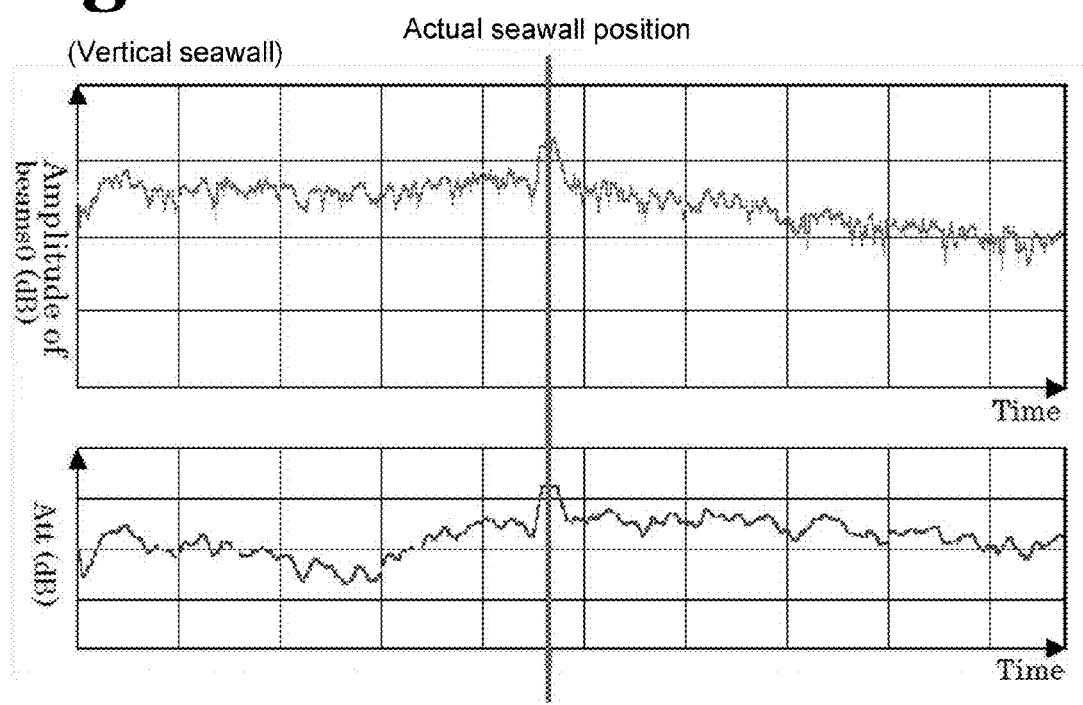
FIG. 21 shows the result of the attenuation Att( ), performed on the amplitude curve of FIG. 15.
Figure 22:
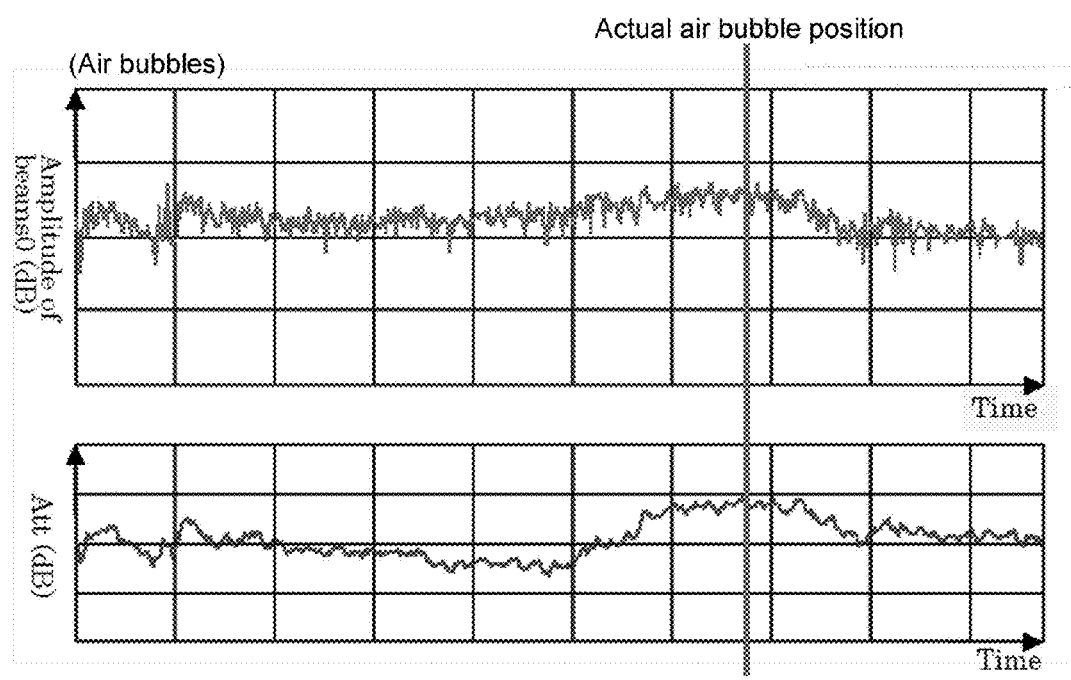
FIG. 22 shows the result of the attenuation Att( ), performed on the amplitude curve of FIG. 16.

FIG. 21 shows the result of the attenuation filter performed on the amplitude curve of FIG. 15. The vertical scale shows the attenuation Att( ), the horizontal scale shows time (distance), and the vertical line shows the actual position of the seawall in FIG. 21. As can be seen, the amount of attenuation along 20 m increases around the position of the seawall. FIG. 22 shows the result of the attenuation filter performed on the amplitude curve of FIG. 16, in the same way as FIG. 21.

(Step 4)

Classifier 9 stores the r( ) and Att( ) samples calculated in steps 2 and 3.

(Step 5)

Figure 23:
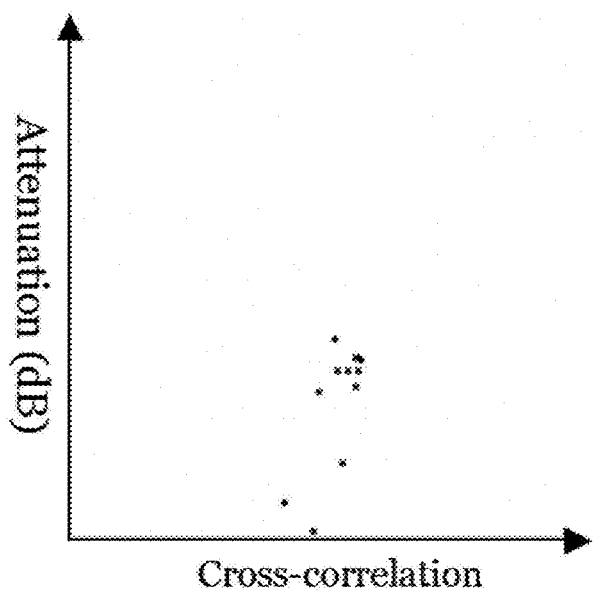
FIG. 23 shows the 2D "Attenuation vs. Cross-correlation" graph based on FIG. 18 and FIG. 21.

Classifier 9 classifies the stored samples into seawall samples or air bubble samples based on r( ) and Att( ) measured at Step 2 and Step 3. The r(x) and Att(x) pairs of samples are plot on a 2D "Attenuation vs. Cross-correlation" graph, as shown in FIG. 23. Samples of FIG. 23 have been taken from the cross-correlation curve of FIG. 18 and the attenuation curve of FIG. 21.

In order to determine if one of the samples represented in FIG. 23 is representative of a seawall or not, several methods can be used. The method explained below is the preferred one.

It is based on Bayesian theory, a fundamental statistical approach to the problem of pattern classification. When an attenuation of amplitude occurs on beams0, the idea is to classify such echo either as a seawall echo or an air bubble echo, i.e. a non-seawall echo.

Figure 24:
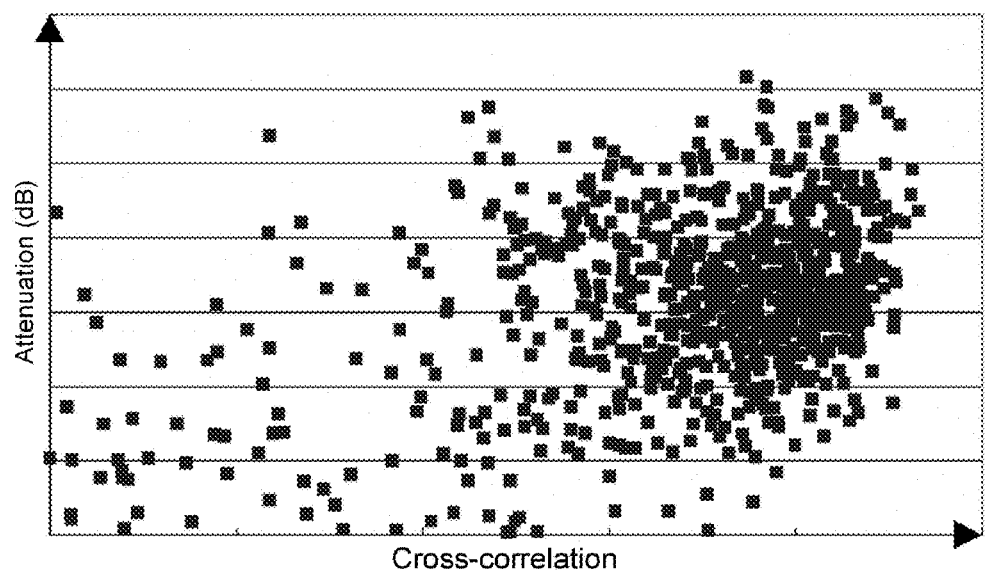
FIG. 24 shows the 2D "Attenuation vs. Cross-correlation" graph of seawalls.
Figure 25:
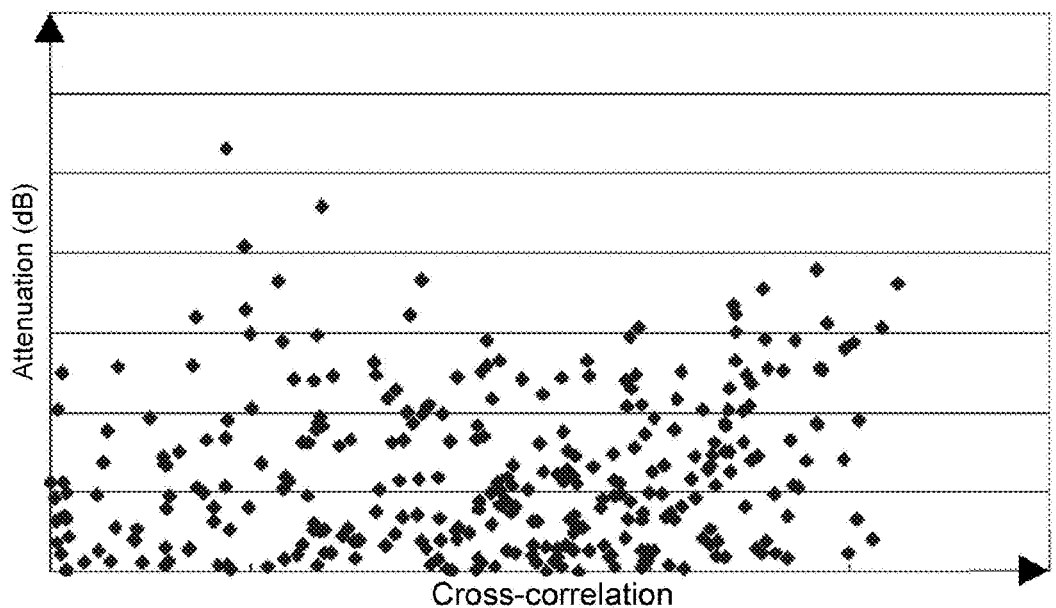
FIG. 25 shows the 2D "Attenuation vs. Cross-correlation" graph of air bubbles.

In order to do that, several echoes from all sorts of seawalls and several air bubble echoes taken in various situations have been acquired. Knowing the true nature of the echo, cross-correlation and attenuation of the seawall echoes and the air bubble echoes have been calculated separately. FIG. 24 shows the seawall echoes represented on a 2D Attenuation vs. Cross-correlation graph. FIG. 25 shows the air bubble echoes represented on a 2D Attenuation vs. Cross-correlation graph. At this stage, as can be seen from FIG. 24, in the case of a seawall, there is a high density of echoes in the right hand side, whereas air bubble echoes are more spread, with a higher density in the lower part of FIG. 25.

The following eq. 4 shows how the probability density of seawall echoes and air bubble echoes has been calculated.

$$p(x/\omega_j) = \frac{1}{N} \sum_{i=1}^{N} \frac{1}{(2\pi \cdot h^2)^{M/2}} \exp\left(-\frac{\|x - x_i\|^2}{2h^2}\right) \quad \text{(eq. 4)}$$

where
x represents an attenuation/cross-correlation vector.
$\omega_j$ for $1 \leq j \leq 2$ represents the state of nature of the echo. $\omega_1$ corresponds to seawall, $\omega_2$ corresponds to air bubble.
M represents the number of dimensions. In this particular application, there is 1 dimension for cross-correlation and 1 dimension for attenuation. Therefore M=2.
h represents the number of partitions in which each dimension is split. In this particular application, as each dimension is split into 10 partitions, the probability density $p(x/\omega_j)$ is calculated at $(10+1)^2=121$ positions x.
N represents the number of samples considered to calculate the probability density of seawall and air bubble.
$\|x-x_i\|$ represents the distance between vector x and the $x_i$ sample. If vectors x and $x_i$ have respective coordinates $(a_x, b_x)$ and $(a_{xi}, b_{xi})$ in the 2D attenuation vs. cross-correlation graph then, $\|x-x_i\|=\sqrt{(a_x-a_{xi})^2+(b_x-b_{xi})^2}$.

Figure 26:
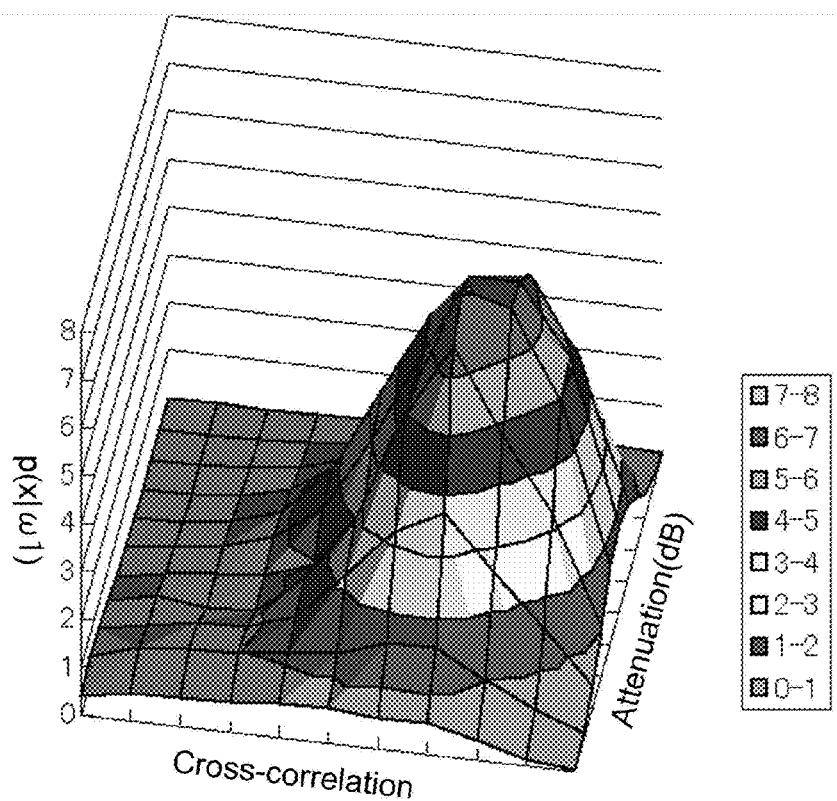
FIG. 26 shows the probability density of seawalls.
Figure 27:
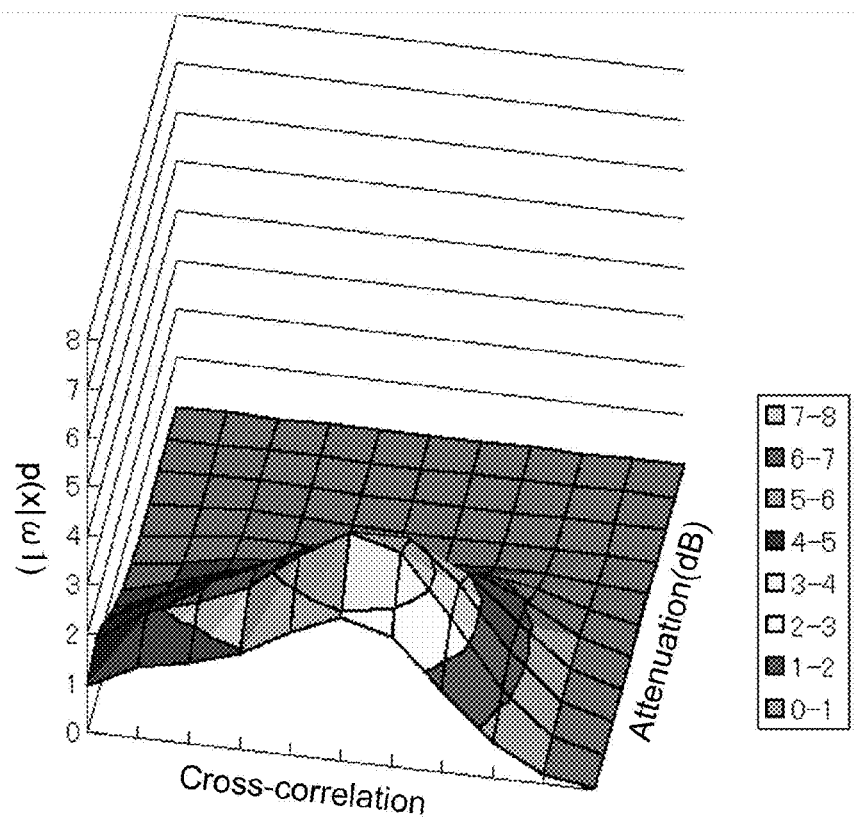
FIG. 27 shows the probability density of air bubbles.

$p(x/\omega_j)$ is called the probability density for x given that the state of nature is $\omega_j$. It is also called the likelihood of $\omega_j$ with respect to x. FIG. 26 and FIG. 27 show respectively the probability density of seawalls and air bubbles.

Knowing the probability density of seawalls and air bubbles, the aim was to define the seawall zone and the air bubble zone in the attenuation vs. cross-correlation graph. The aim of such zones is to be able to say that if an echo comes in the seawall zone then it is a seawall; if an echo comes in the air bubble zone then it is not a seawall. If these zones are well defined, the error rate is at a minimum.

Figure 28:
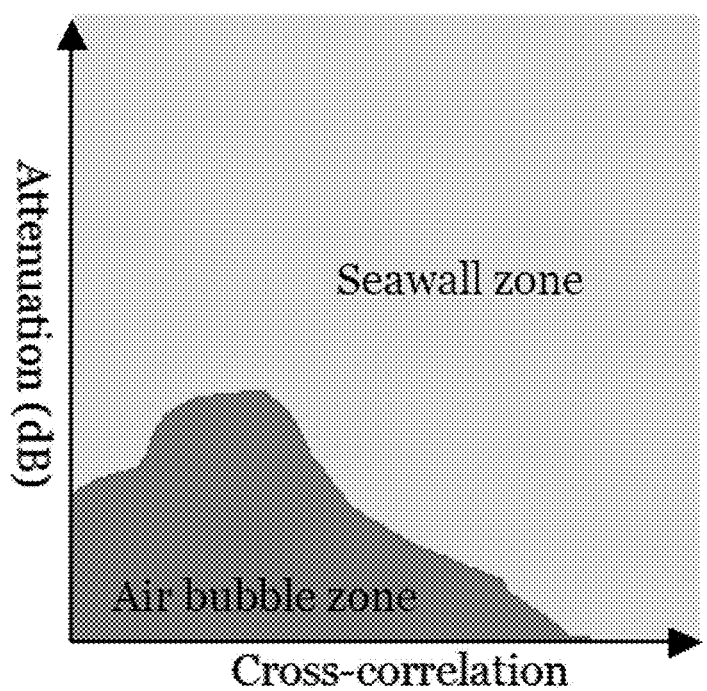
FIG. 28 shows seawall and air bubble zones in 2D "Attenuation vs. Cross-correlation" graph, based on Bayesian theory.

Defining the seawall and air bubble zones consists of finding the "valley" between the "mountains" of the probability density of seawalls and air bubbles. The "valley" or the border between the 2 zones is defined as the line such that:

$$W \cdot p(x|\omega_1) - p(x|\omega_2) = 0 \quad \text{(eq. 5)}$$

where W is an adjustable weighting factor on the seawall distribution. In this application, the seawall and air bubble zones are defined as shown in FIG. 28.

Figure 29:
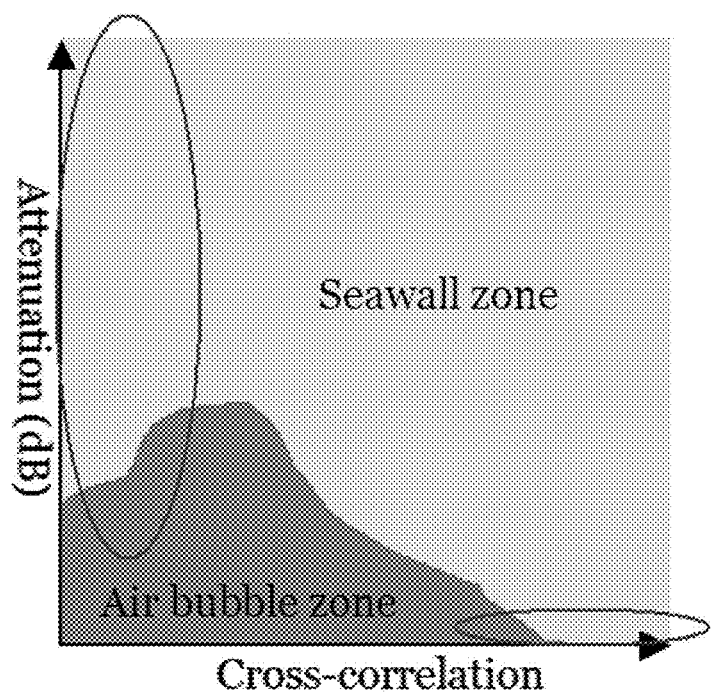
FIG. 29 shows seawall and air bubble zones in 2D "Attenuation vs. Cross-correlation" graph.

Finally, from our experience in detecting seawalls, we know that the areas circled in FIG. 29 are of little interest for seawall detection purpose.

Figure 30:
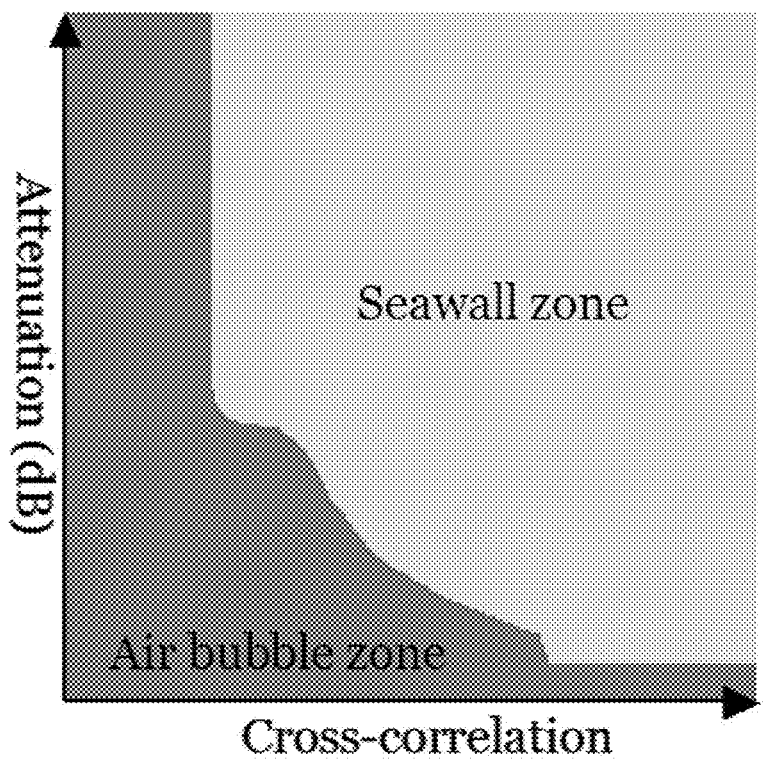
FIG. 30 shows the preferred seawall and air bubble zones in 2D "Attenuation vs. Cross-correlation" graph.

From our experience, echoes falling in these areas are more likely to be air bubble echoes than seawall echoes. Therefore, we modified "manually" the limit between seawall and air bubble zones as shown in FIG. 30.

This constitutes our preferred classifier to determine if an echo is a seawall or not.

Therefore, once the r( ) and Att( ) curves are calculated, the r(x) and Att(x) pairs of samples are plotted on the classifier.

Figure 31:
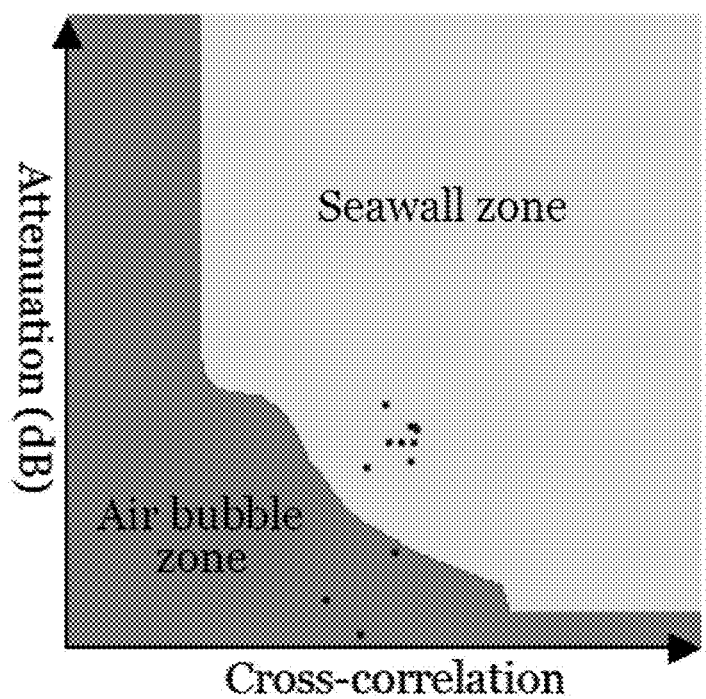
FIG. 31 plots the cross-correlation samples of FIG. 18 and the attenuation samples of FIG. 21 on top of the preferred seawall and air bubble zones.

FIG. 31 shows the result of plotting the r(x) samples of FIG. 18 and the Att(x) samples of FIG. 21 on the classifier.

Echoes that fall into the seawall zone are considered as samples representative of a seawall. If more than one sample is representative of a seawall as shown in FIG. 31, the sample with the maximum amplitude is selected as the sample representative of the seawall.

Figure 32:
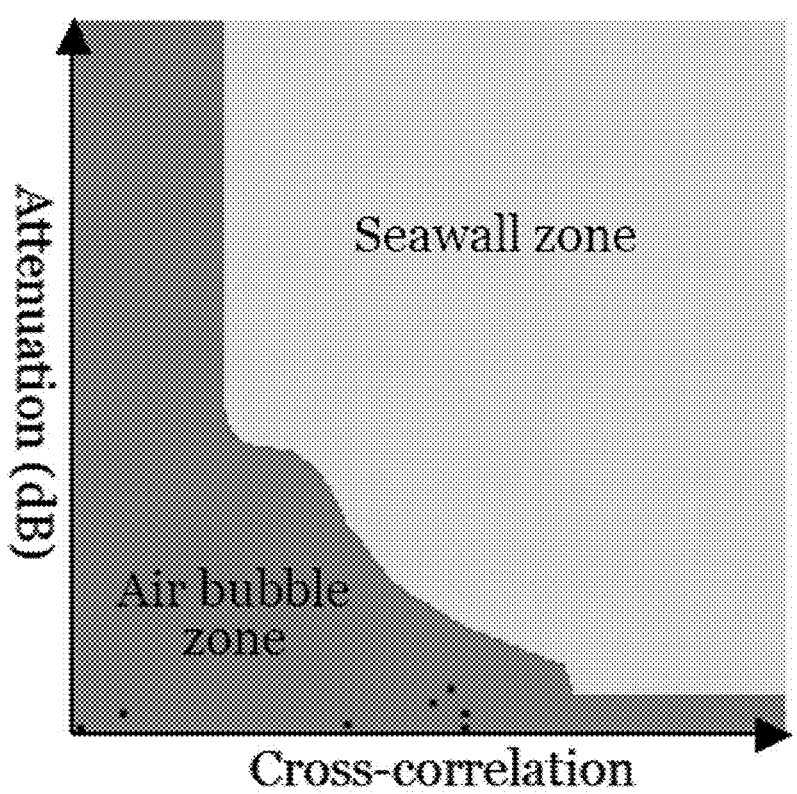
FIG. 32 plots the cross-correlation samples of FIG. 19 and the attenuation samples of FIG. 22 on top of the preferred seawall and air bubble zones.

FIG. 32 shows the result of plotting the r(x) samples of FIG. 19 and the Att(x) samples of FIG. 22 on Classifier 9.

As no samples reach the seawall zone, the attenuation of amplitude that occurred in FIG. 16 is not classified as a seawall echo.

Figure 33:
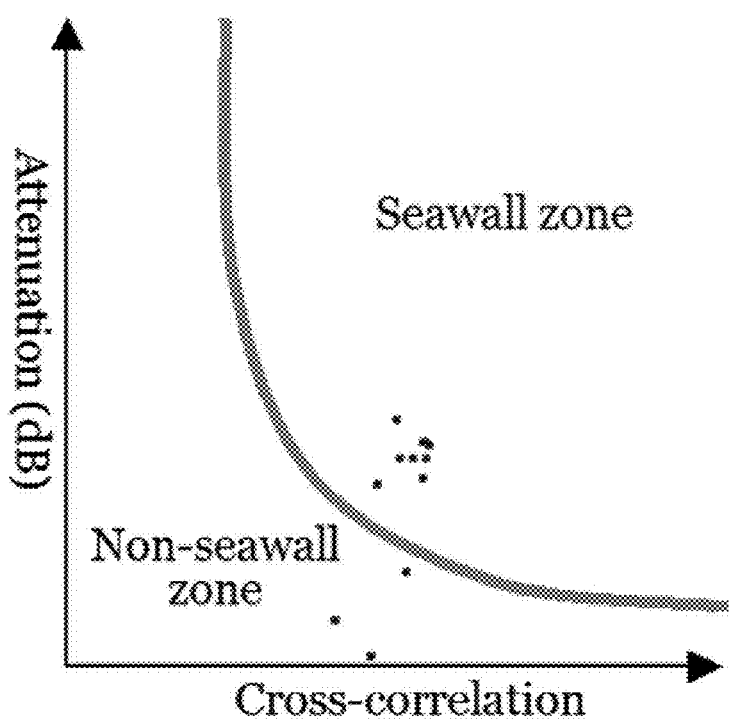
FIG. 33 shows a possible threshold to define the seawall and non-seawall zones.

It is to be noted that once r(x) and Att(x) samples are plot on the 2D attenuation vs. cross-correlation graph, several other methods could be used to determine if one of these samples is a seawall or not. The list below is not exhaustive but this could be done by simply setting a threshold on the 2D graph in order to define a seawall zone and a non-seawall zone, as shown in FIG. 33.

More sophisticated pattern recognition techniques based on stochastic methods could also be used. For example, soft computing methods such as neural networks or fuzzy logic are often used for pattern recognition.

(Step 6)

Figure 34:
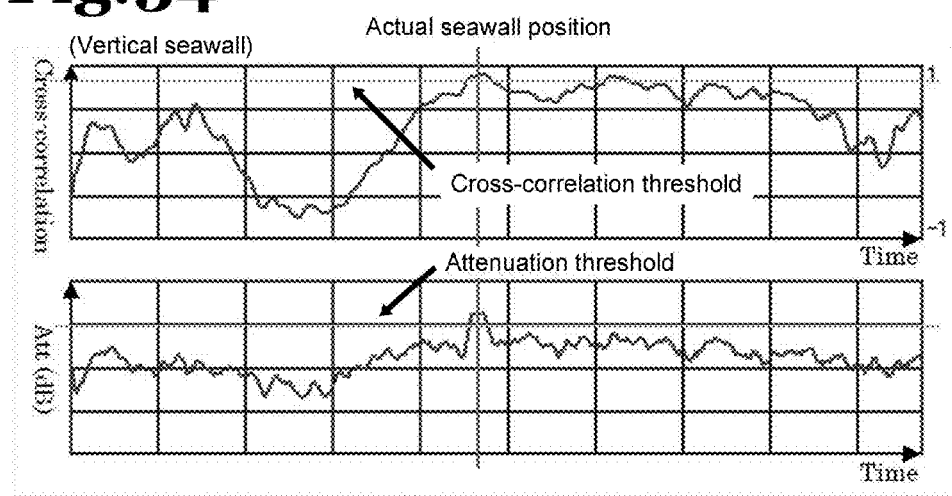
FIG. 34 shows a cross-correlation threshold and an attenuation threshold.

Seawall Detector 10 detects the seawall position based on the samples classified as seawall at Step 5. For every r(t) and Att(t) pairs of the seawall samples, Seawall Detector 10 searches the positions t where r(t) and Att(t) are respectively over the cross-correlation and attenuation thresholds at the same time. FIG. 34 gathers the cross-correlation result of FIG. 18 and the attenuation result of FIG. 21 and shows the cross-correlation and attenuation thresholds. The vertical scale in upper view of FIG. 34 shows r( ), the vertical scale in lower view of FIG. 34 shows Att( ), the horizontal scale shows time (distance) in both views of FIG. 34 and the vertical line in both views shows the actual position of the seawall in FIG. 34.

(Step 7)

Figure 35:
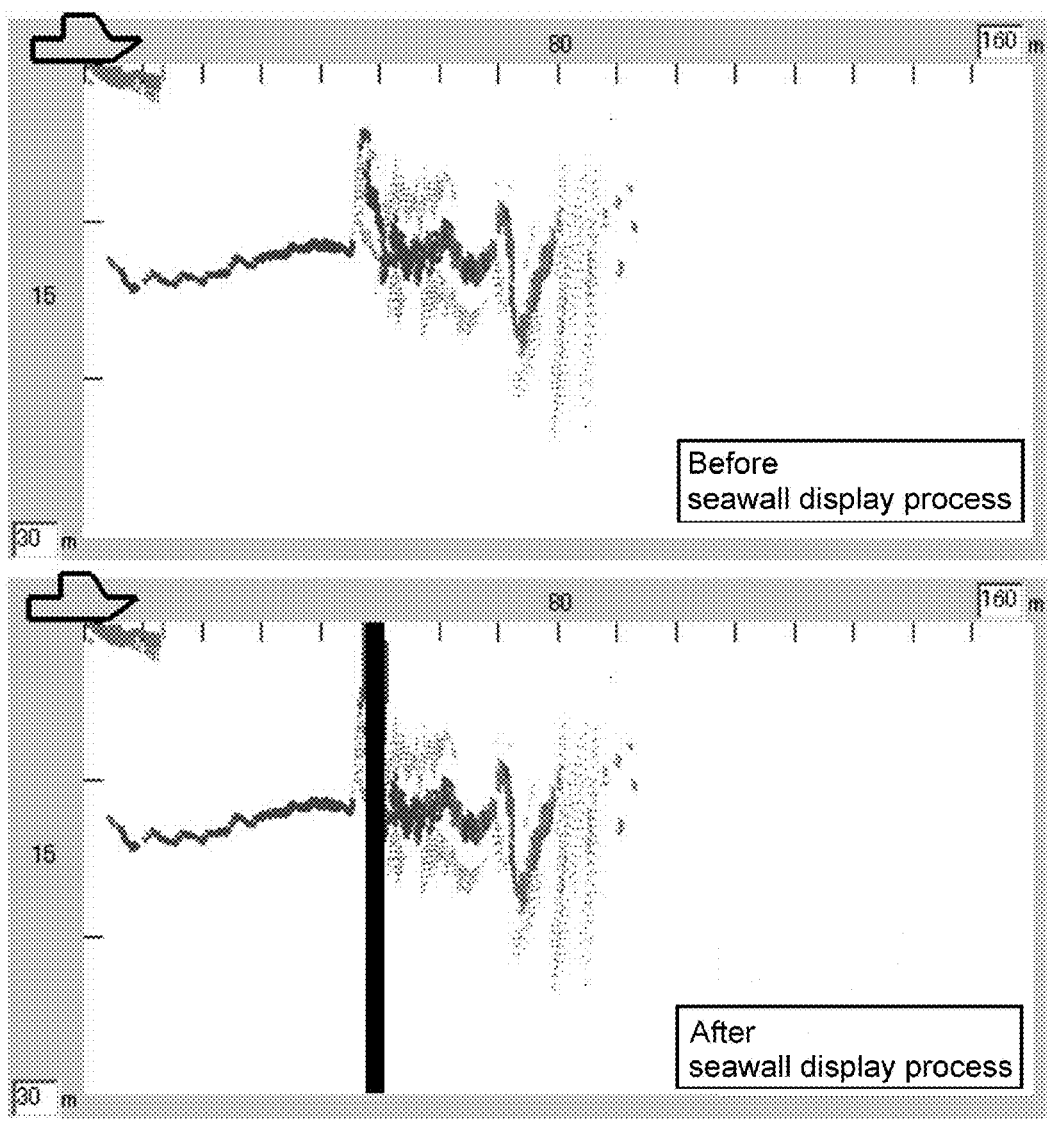
FIG. 35 shows how a detected seawall is displayed.

Seawall Display Processor 11 displays the seawall in Indicator 12 based on the detected position in Step 6 as shown FIG. 35. The vertical scale shows the depth of water, and the horizontal scale shows the distance ahead in FIG. 35. Seawall Display Processor 11 displays the seawall uniformly from bottom part of the screen to the water surface.

Using the steps above, Underwater Detection Apparatus 110 can supplement and display properly from the seawall to the water surface.

It is to be noted that instead of using the representation method above to display the seawall echo, other methods to indicate the presence of a seawall to the user could be used, for example, by the use of a sound alarm or any other visual alarm on the display. In addition, it is also to be noted that this method is not only limited to a split beam system. This method can be used as long as the amplitude information of a receiving beam directed towards the seawall can be retrieved.

Figure 36:
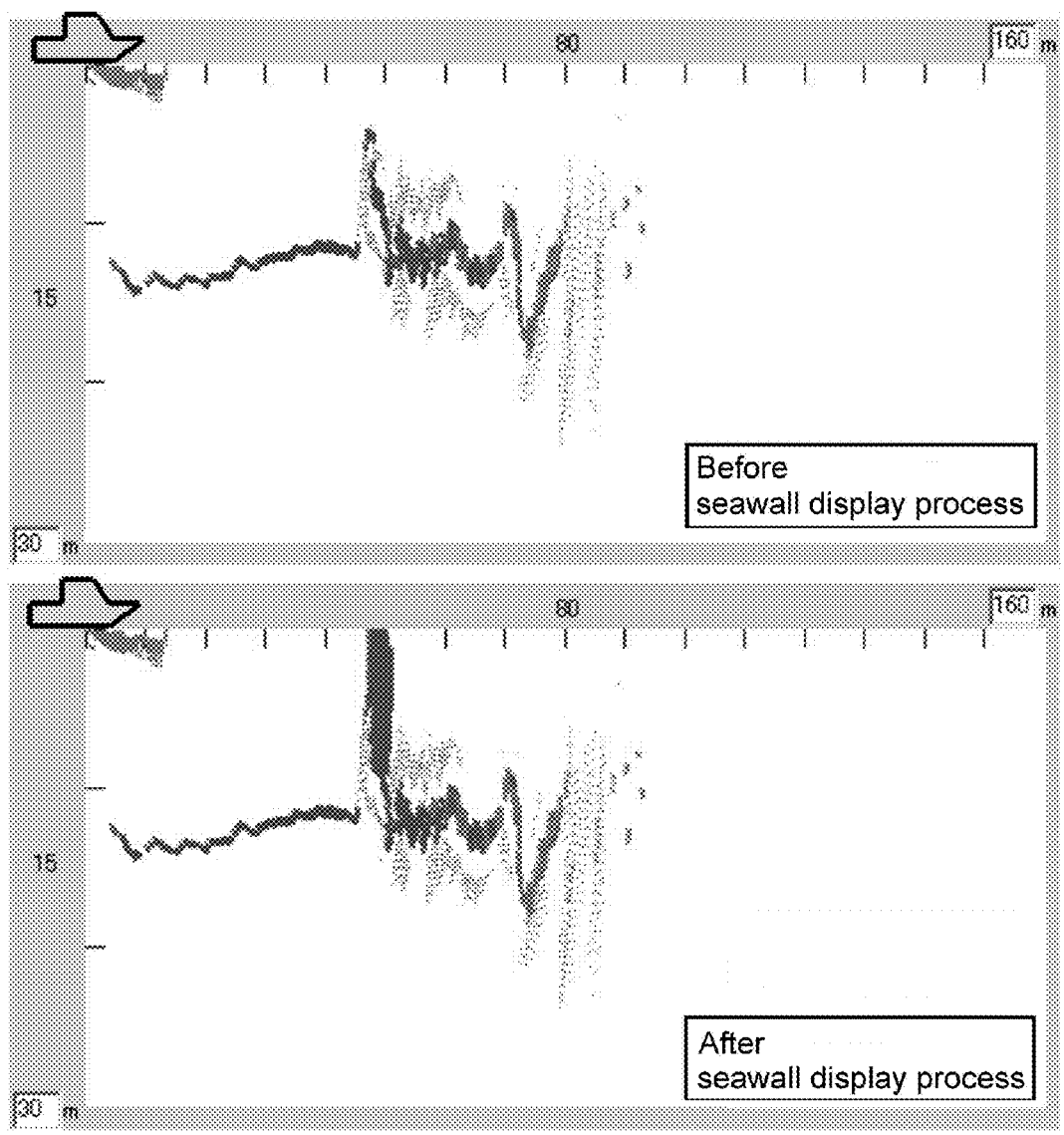
FIG. 36 shows how a seawall echo is stretched up to the water surface.

In another embodiment, Seawall Display Processor 11 displays the seawall up to the water surface from the actual echo of the seawall before the seawall detection process, as shown FIG. 36.

Seawall Display Processor 11 displays the seawall in Indicator 12 based on the position of the seawall detected by Seawall Detector 10 and the echo displayed by Echo Display Processor 4. Once Seawall Detector 10 detects the seawall position, the echo representative of the seawall is stretched up identically until the water surface so that the seawall echo does appear displayed up to the water surface as shown in FIG. 36. The upper view of FIG. 36 shows the display only based on echo display processor 4; the lower view of FIG. 36 shows the display after stretching the seawall echo from the upper view up until the water surface.

As mentioned above, Underwater Detection Apparatus 110 supplements and displays properly seawalls that were not displayed up to the water surface. As a result, the display of the underwater state becomes more realistic than conventional display.

Further, when displaying the seawall on the screen of the FLS, the reason why the echo of the detected seawall is simply stretched up comes from the fact that the seawall detection process occasionally produces false alarm detection on air bubble echoes. Indeed air bubbles close to the water surface, created by propellers of other motorboats can have similar characteristic to seawalls. As air bubbles reflect ultrasound, ultrasound waves hardly go through thick mass of air bubbles. Consequently, an attenuation of the amplitude curve received on beamsϕcan occur behind the position of such mass of air bubbles, and it can possibly create a false alarm.

Alarming the user just because of a misdetection of an air bubble echo would not be acceptable for the user. However, as air bubble echoes usually appear close to the water surface, stretching such an echo up to the water surface will not change much the display of such air bubbles.

Figure 37:
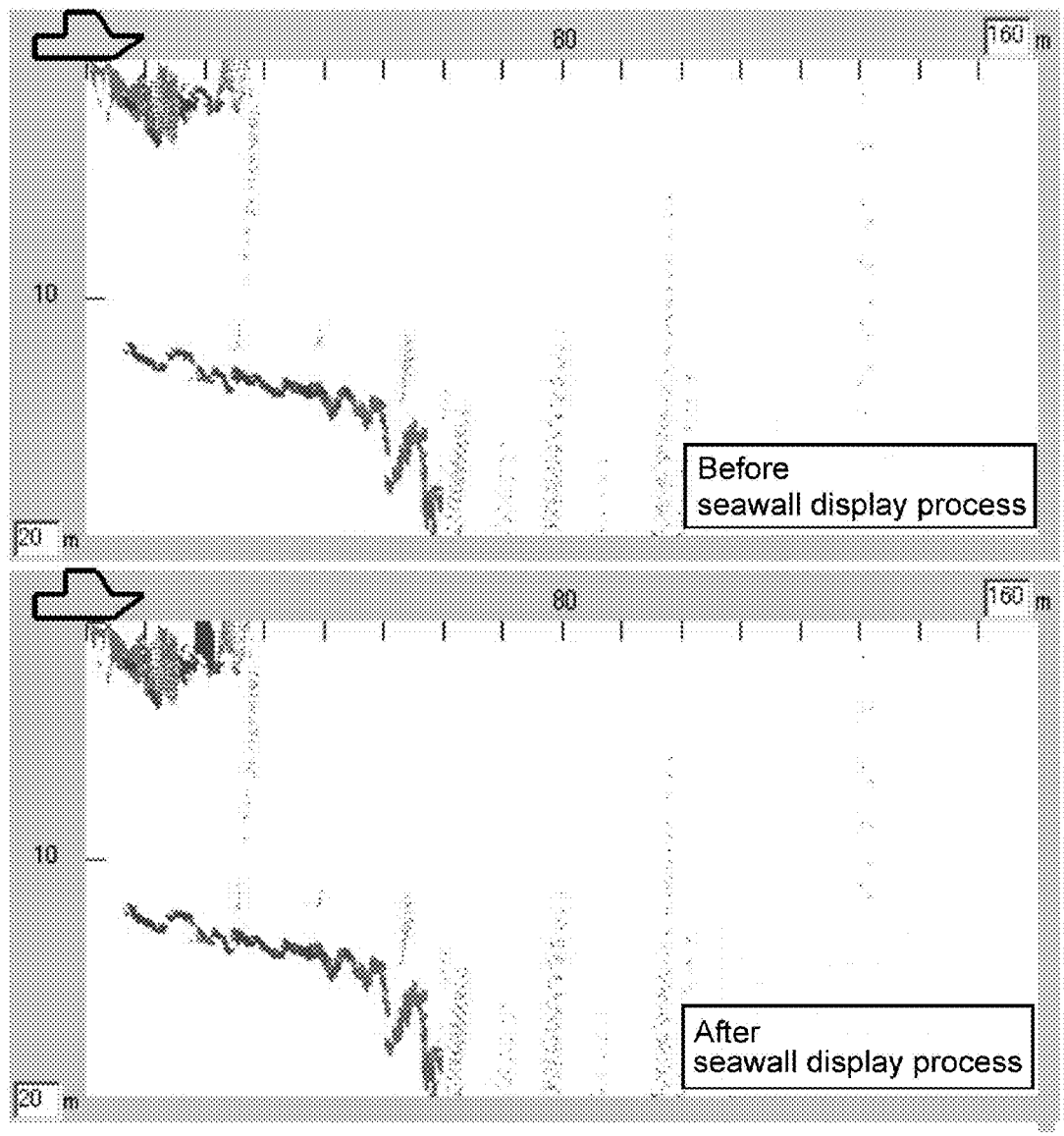
FIG. 37 shows how an air bubble echo is stretched up to the water surface.

The upper view of FIG. 37 shows a mass of air bubbles up to 20 m in front of the vessel. The back end of this mass of air bubbles has been wrongly detected as a seawall echo. The lower view of FIG. 37 shows how the echo is stretched up to the water surface. Such view however does not look like a seawall to the user. With such view, there is no ambiguity for the user whether there is a seawall or not.

It is to be noted that from FIG. 38 to FIG. 41 show experimental data when Underwater Detection Apparatus 110 is in front of an inclined seawall rather than a vertical seawall.

Figure 38:
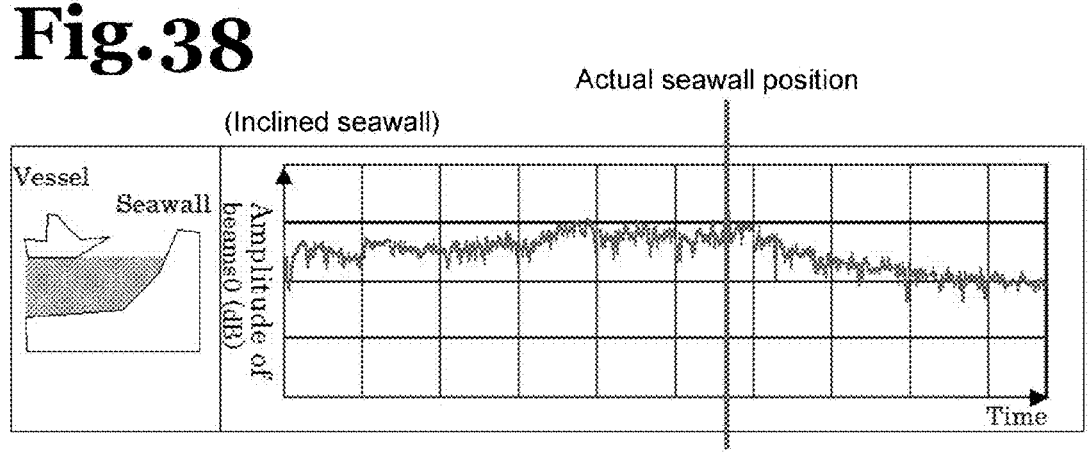
FIG. 38 shows an amplitude information of beams0, taken in front of an inclined seawall.

FIG. 38 shows the amplitude information of beamsϕ, taken this time in front of an inclined seawall. The vertical scale shows the amplitude, the horizontal scale shows time (distance), and the vertical line shows the actual position of the seawall in FIG. 38. In this situation, the only characteristic that stands out of the amplitude curve is:

The attenuation of the amplitude after the position of the seawall.

As can be seen from the vertical seawall situation (Embodiment 1) and the inclined seawall situation, a peak of amplitude does not necessarily occur in presence of seawall. However, as no echoes are coming back from behind the seawall, the amplitude behind the seawall decreases with time, regardless of the shape of the seawall.

Figure 39:
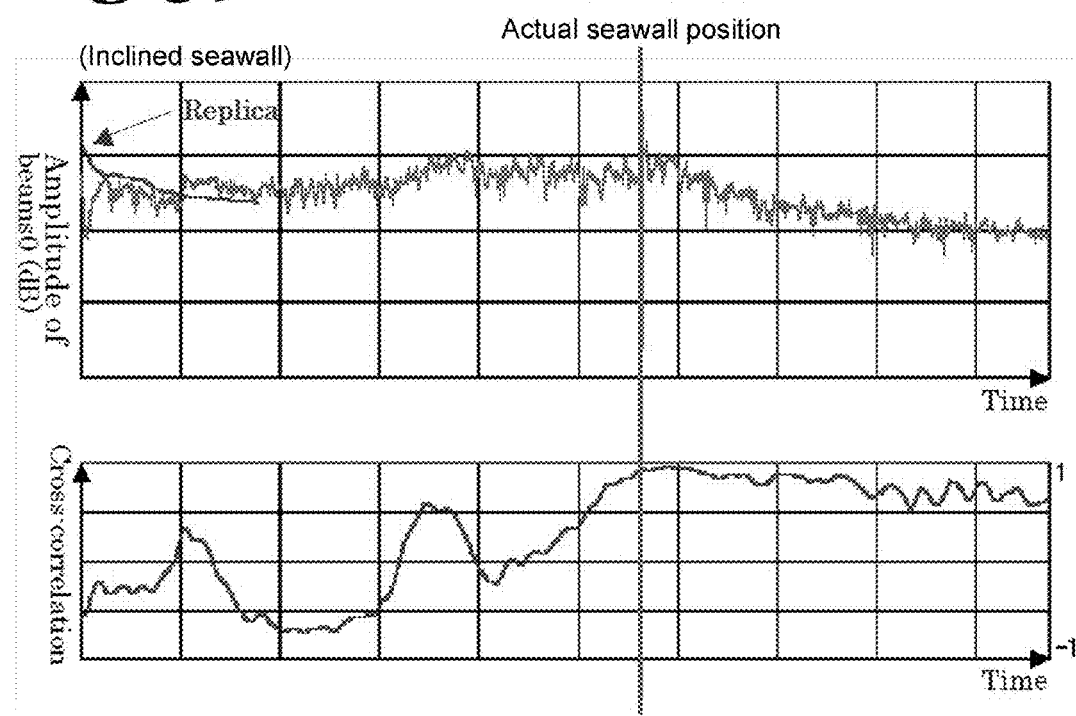
FIG. 39 shows the result of a cross-correlation r( ), performed on the amplitude curve of FIG. 38.

The lower view of FIG. 39 shows the result of the cross-correlation r( ), performed on the same amplitude curve as FIG. 38. The vertical scale shows r( ), the horizontal scale shows time (distance), and the vertical line shows the actual position of the seawall in FIG. 39. As can be seen in FIG. 39, the cross-correlation level at the seawall position reaches values close to 1.

Figure 40:
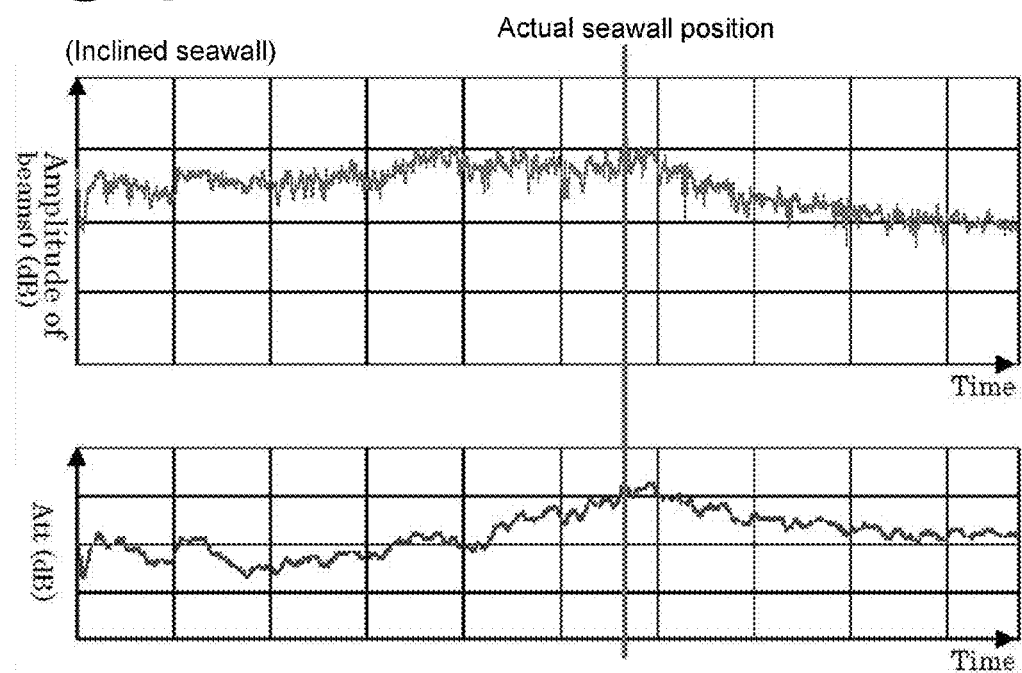
FIG. 40 shows the result of the attenuation Att( ), performed on the amplitude curve of FIG. 38.

The lower view of FIG. 40 shows the result of the attenuation filter performed on the same amplitude curve as FIG. 38. The vertical scale shows Att( ), the horizontal scale shows time (distance), and the vertical line shows the actual position of the seawall in FIG. 40. As can be seen, the amount of attenuation along 20 m increases around the position of the seawall.

Figure 41:
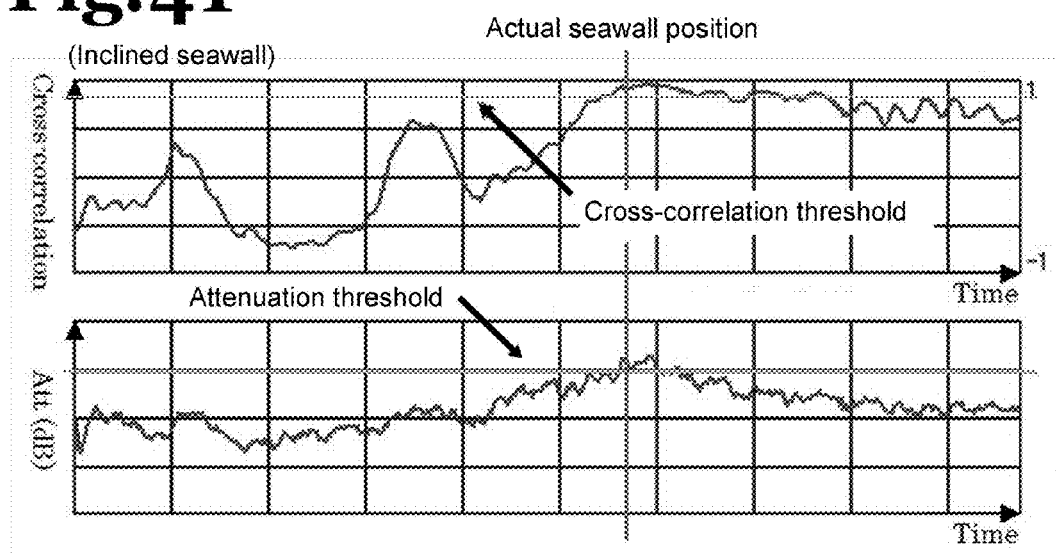
FIG. 41 shows a cross-correlation threshold and an attenuation threshold.

FIG. 41 gathers the cross-correlation result of FIG. 39 and the attenuation result of FIG. 40. The vertical scale in the upper view of FIG. 41 shows r( ), the vertical scale in the lower view of FIG. 41 shows Att( ), and the horizontal scales both show time (distance) in FIG. 41.

Underwater Detection Apparatus 110 calculates the cross-correlation and the attenuation, and detects the position of the inclined seawall in the same way as for a vertical seawall.

What is claimed is:

1. An underwater detection apparatus for detecting a target by transmitting and receiving an ultrasound signal, comprising:
   a replica memory module that is configured to store a typical amplitude evolution of a seawall echo during a predetermined time period as a template-replica;
   a correlator module that is configured to determine a correlation between the amplitude evolution of an echo signal reflected from the target and the template-replica;
   a seawall detector module that is configured to detect a seawall position based on the correlation; and
   a seawall display processor module that is configured to display the seawall on its position in an indicator.

2. The underwater detection apparatus according to claim 1, further comprising:
   an attenuator module that is configured to determine an echo signal attenuation reflected from the target during a predetermined time period; and
   wherein the seawall detector module detects the seawall position based on the correlation and the echo signal attenuation.

3. The underwater detection apparatus according to claim 2, further comprising:
   a classifier module that is configured to classify the echo signal into a seawall echo or a non-seawall echo, based on a comparison of the correlation and the attenuation using a stochastic method; and
   wherein the seawall detector module detects the seawall position based on at least one of the correlation and the echo signal attenuation if the classifier module classifies the echo signal into the seawall echo.

4. The underwater detection apparatus according to claim 3:
   wherein the stochastic method is based on Bayesian theory.

5. The underwater detection apparatus according to claim 1, further comprising:
   an echo display processor module that is configured to display echoes reflected from multiple targets in a split beam system; and
   wherein the seawall display processor module displays the seawall from an upper portion of the displayed echo to a water surface.

6. An underwater detection apparatus for detecting a target by transmitting and receiving an ultrasound signal, comprising:
   an attenuator module that is configured to determine an echo signal attenuation reflected from the target during a predetermined time period;
   a seawall detector module that is configured to detect a seawall position based on the echo signal attenuation; and
   a seawall display processor module that is configured to display the seawall on its position in an indicator.

7. The underwater detection apparatus according to claim 6, further comprising:
   an echo display processor module that is configured to display echoes reflected from multiple targets in split beam system; and
   wherein the seawall display processor module displays the seawall from an upper portion of the displayed echo to a water surface on its position.

* * * * *

UNITED STATES PATENT AND TRADEMARK OFFICE
CERTIFICATE OF CORRECTION

PATENT NO. : 7,663,975 B2
APPLICATION NO. : 12/079393
DATED : February 16, 2010
INVENTOR(S) : Jerome Dubuis, Hitoshi Maeno and Florian Girault It is certified that error appears in the above-identified patent and that said Letters Patent is hereby corrected as shown below:

Title Page, Item (73) should read:

-- Assignee: Furuno Electric Company Limited, Nishinomiya-shi (JP) --.

Signed and Sealed this

Sixth Day of April, 2010

David J. Kappos
*Director of the United States Patent and Trademark Office*